(12) United States Patent
Kawanishi

(10) Patent No.: US 11,388,298 B2
(45) Date of Patent: Jul. 12, 2022

(54) IMAGE FORMING APPARATUS AND CONTROL METHOD THEREFOR

(71) Applicant: CANON KABUSHIKI KAISHA, Tokyo (JP)

(72) Inventor: Masaki Kawanishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/909,774

(22) Filed: Jun. 23, 2020

(65) Prior Publication Data

US 2020/0412888 A1 Dec. 31, 2020

(30) Foreign Application Priority Data

Jun. 26, 2019 (JP) .............................. JP2019-118805

(51) Int. Cl.
*H04N 1/00* (2006.01)
*G06F 3/12* (2006.01)

(52) U.S. Cl.
CPC ....... *H04N 1/00474* (2013.01); *G06F 3/1205* (2013.01); *G06F 3/1258* (2013.01); *H04N 1/00424* (2013.01); *H04N 1/00482* (2013.01); *G06F 3/1292* (2013.01)

(58) Field of Classification Search
CPC ........... H04N 1/00474; H04N 1/00482; H04N 1/00424; H04N 1/00; G06F 3/1205; G06F 3/1258; G06F 3/1291; G06F 3/1229; G06F 3/1222; G06F 3/1267; G06F 3/12
USPC ....................................................... 358/1.15
See application file for complete search history.

(56) References Cited

U.S. PATENT DOCUMENTS

| | | | | |
|---|---|---|---|---|
| 5,872,569 | A * | 2/1999 | Salgado | G06F 3/1296 399/82 |
| 2008/0168450 | A1* | 7/2008 | Tarumi | G06Q 10/00 718/102 |
| 2014/0064882 | A1* | 3/2014 | Sato | G06F 3/125 412/19 |
| 2019/0089850 | A1* | 3/2019 | Tojo | H04N 1/00395 |
| 2019/0303076 | A1* | 10/2019 | Kato | G06F 3/1253 |

FOREIGN PATENT DOCUMENTS

JP 2007-251279 A 9/2007

* cited by examiner

*Primary Examiner* — Darryl V Dottin
(74) *Attorney, Agent, or Firm* — Canon U.S.A., Inc. IP Division

(57) ABSTRACT

An image forming apparatus sets a setting value about an operation of a first application, and executes the first application with use of the set setting value. The image forming apparatus holds a setting value for a library which is used when a function of the first application is provided as the library, and changes the set setting value to the held setting value for the library when the function of the first application is provided as the library.

10 Claims, 20 Drawing Sheets

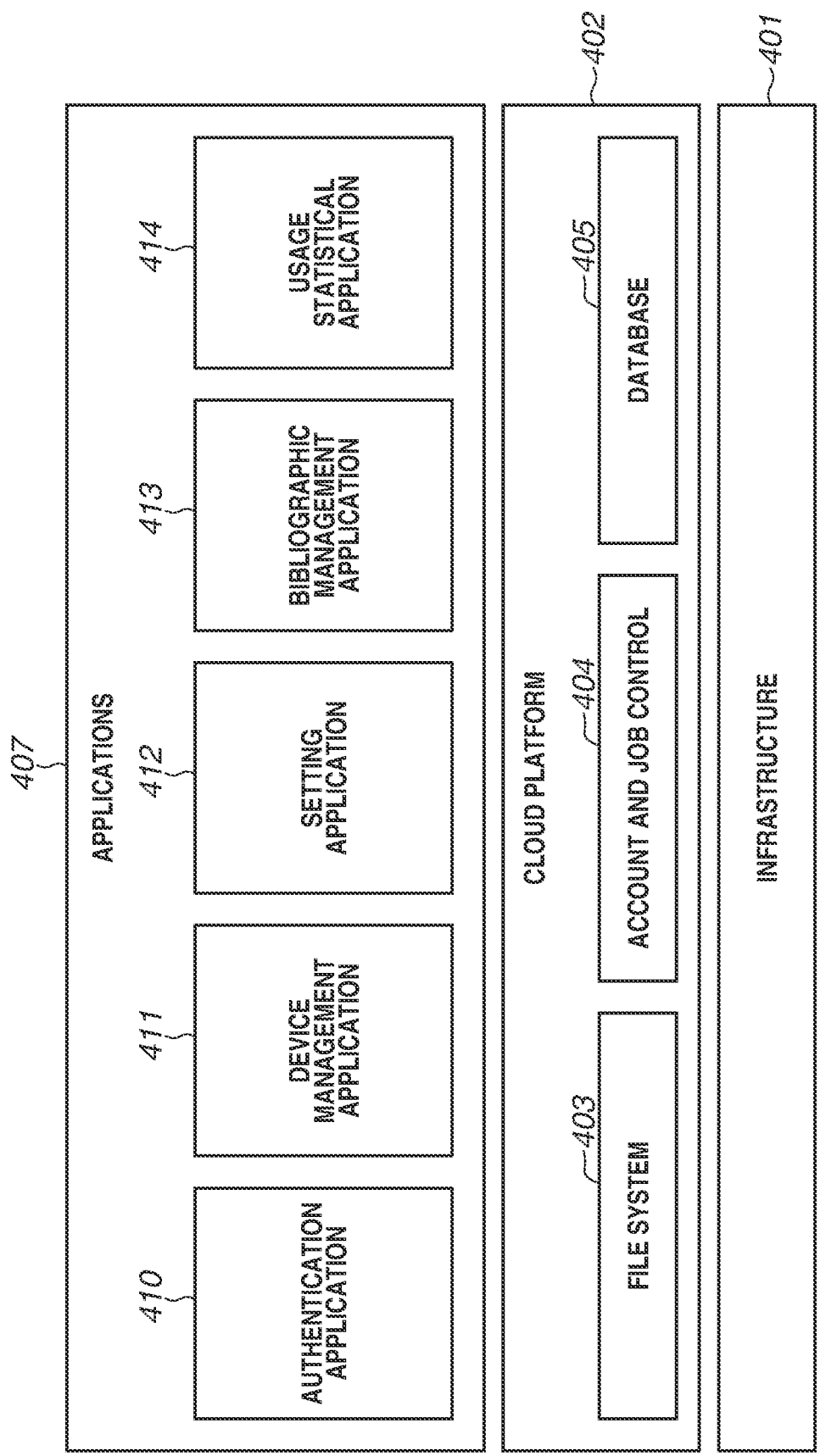

FIG.6A

| | | |
|---|---|---|
| FORCIBLE HOLDING | OFF | ~601 |
| STORAGE PERIOD OF JOB | 1 HOUR | ~602 |
| DELETE JOB AFTER PRINTING | OFF | ~603 |
| RECEIVE ONLY ENCRYPTED SECURE PRINT JOB | OFF | ~604 |
| CAUSE DOMAIN NAME TO BE INCLUDED IN MY JOB DETERMINATION CONDITION | OFF | ~605 |
| DISPLAY JOB OTHER THAN THAT OF AUTHENTICATED USER | OFF | ~606 |
| RESTRICT DELETION OF JOB OTHER THAN THAT OF AUTHENTICATED USER | OFF | ~607 |
| DISCRIMINATE BETWEEN UPPER CASE AND LOWER CASE OF USER NAME | OFF | ~608 |
| SET WARNING OF HOLDING JOB | OFF | ~609 |
| REQUIRE PASSWORD FOR PRINTING OR IMAGE DISPLAY OF MY JOB | ON | ~610 |
| REQUIRE PASSWORD FOR DELETION OF JOB | OFF | ~611 |
| USE AUTOMATIC PRINTING FUNCTION AT THE TIME OF LOGIN | OFF | ~612 |

Table 600

FIG.6B

| | | |
|---|---|---|
| FORCIBLE HOLDING | ON | ~621 |
| STORAGE PERIOD OF JOB | 10 HOURS | ~622 |
| DELETE JOB AFTER PRINTING | OFF | ~623 |
| RECEIVE ONLY ENCRYPTED SECURE PRINT JOB | OFF | ~624 |
| CAUSE DOMAIN NAME TO BE INCLUDED IN MY JOB DETERMINATION CONDITION | OFF | ~625 |
| DISPLAY JOB OTHER THAN THAT OF AUTHENTICATED USER | OFF | ~626 |
| RESTRICT DELETION OF JOB OTHER THAN THAT OF AUTHENTICATED USER | OFF | ~627 |
| DISCRIMINATE BETWEEN UPPER CASE AND LOWER CASE OF USER NAME | OFF | ~628 |
| SET WARNING OF HOLDING JOB | OFF | ~629 |
| REQUIRE PASSWORD FOR PRINTING OR IMAGE DISPLAY OF MY JOB | OFF | ~630 |
| REQUIRE PASSWORD FOR DELETION OF JOB | OFF | ~631 |
| USE AUTOMATIC PRINTING FUNCTION AT THE TIME OF LOGIN | OFF | ~632 |

Table 620

FIG.8

| USER NAME | JOB ID | RECEPTION DATA AND TIME | STORAGE LOCATION | | JOB NAME | PRINT SETTING | | | | | |
|---|---|---|---|---|---|---|---|---|---|---|---|
| | | | IP ADDRESS | PATH | | COLOR | SIZE | NUMBER OF COPIES | DUPLEX | STAPLING | PUNCHING |
| sato | 1 | 2019.05.14 15:05 | 192.168.0.1 | /printdata/1/data.prn | index.html | BW | A4 | 3 | SIMPLEX | NO | 2 HOLES |
| | 2 | 2019.05.14 17:21 | 192.168.0.2 | /printdata/2/data.prn | Meeting.docx | CL | A3 | 1 | DUPLEX | UPPER LEFT SINGLE | NO |

800
801 802 803 804 805

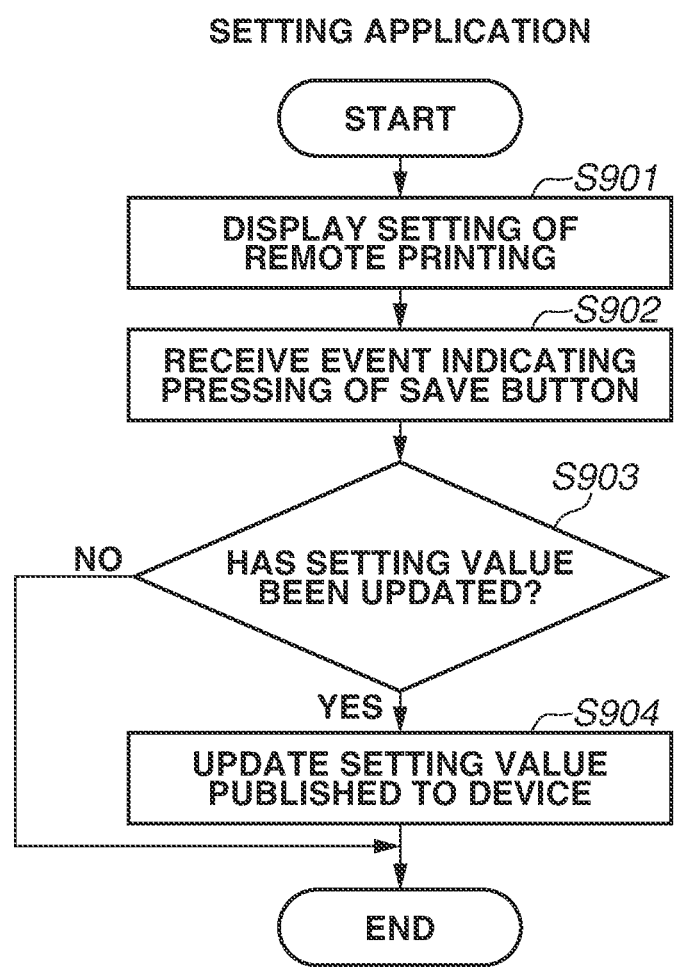

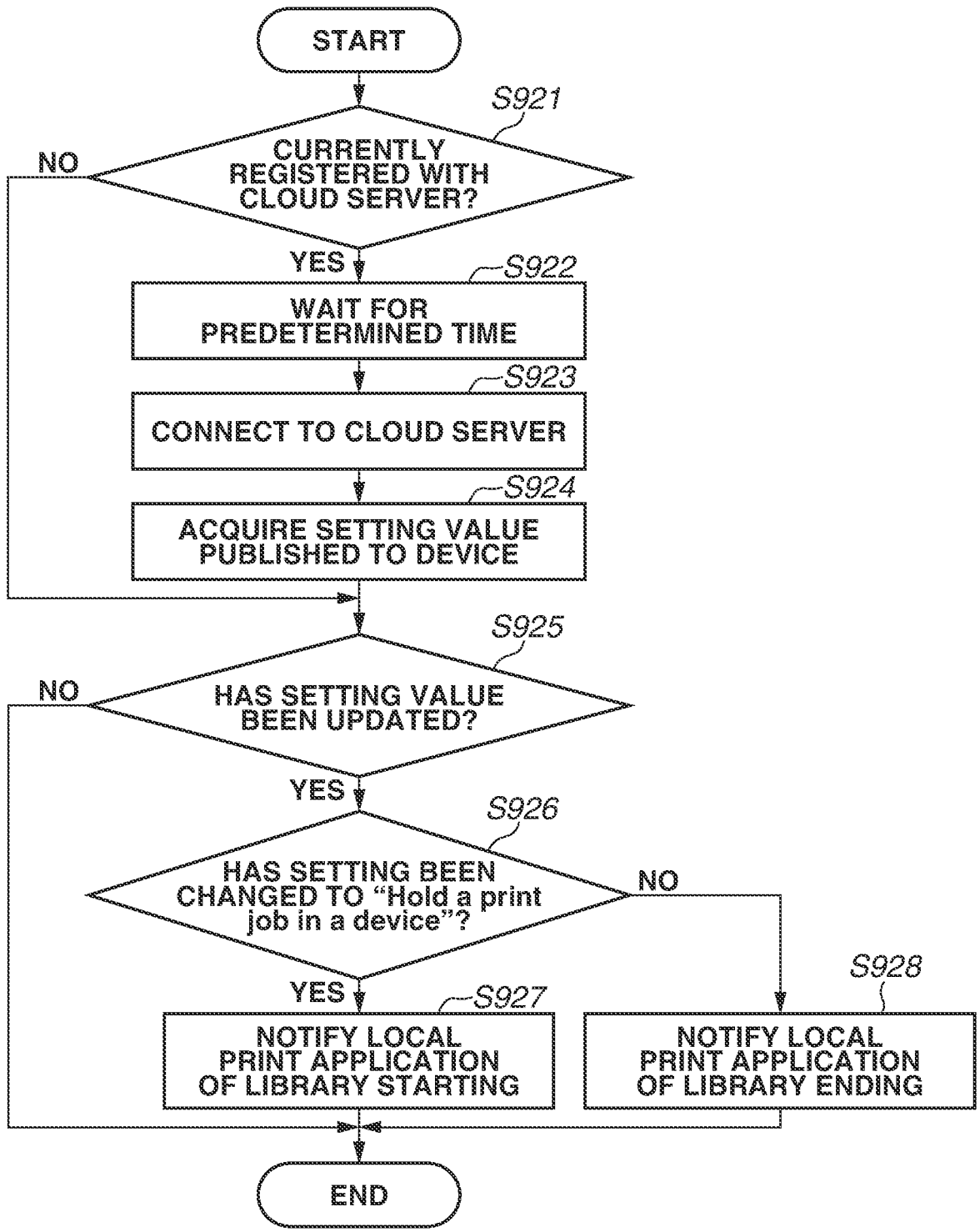

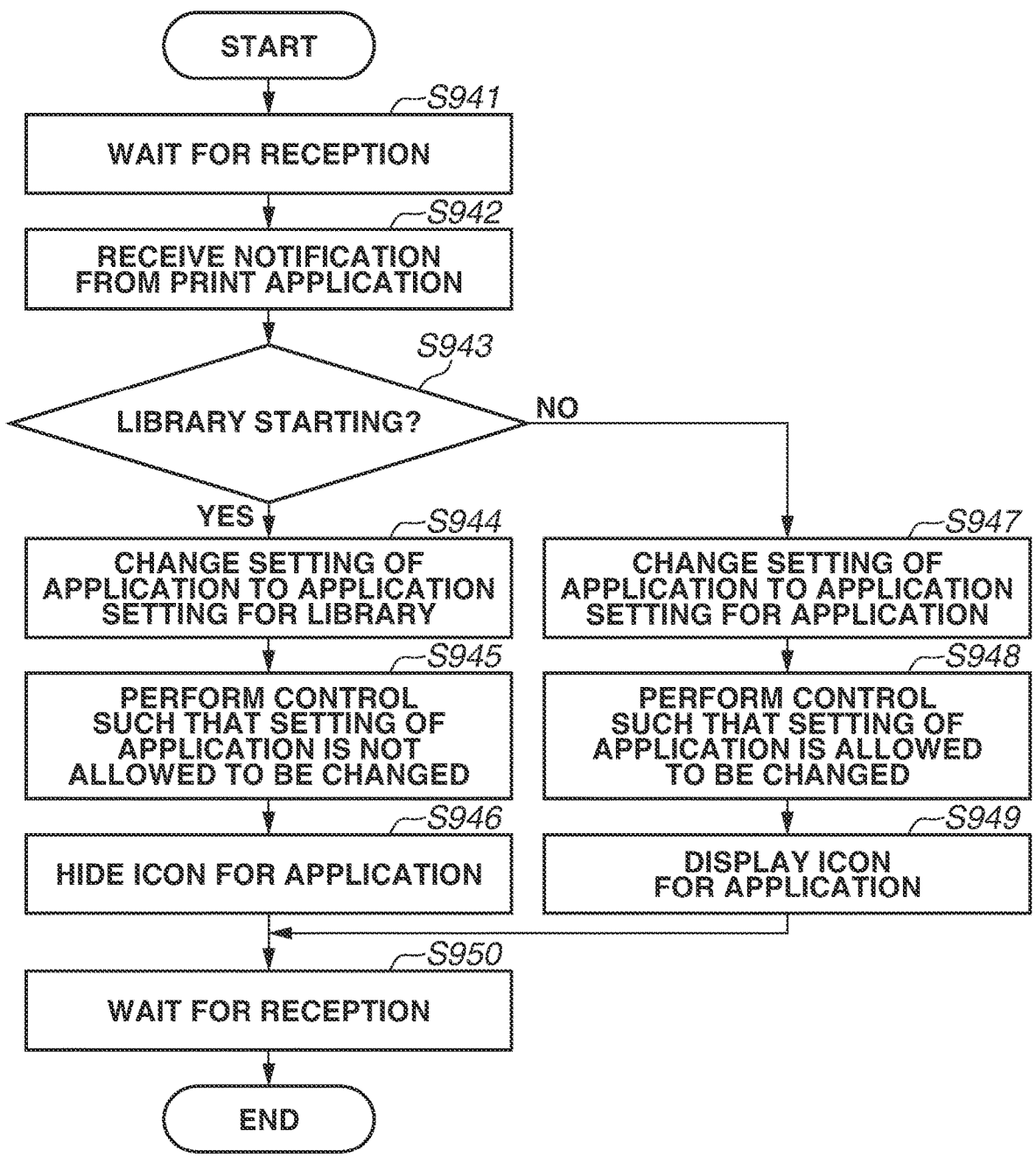

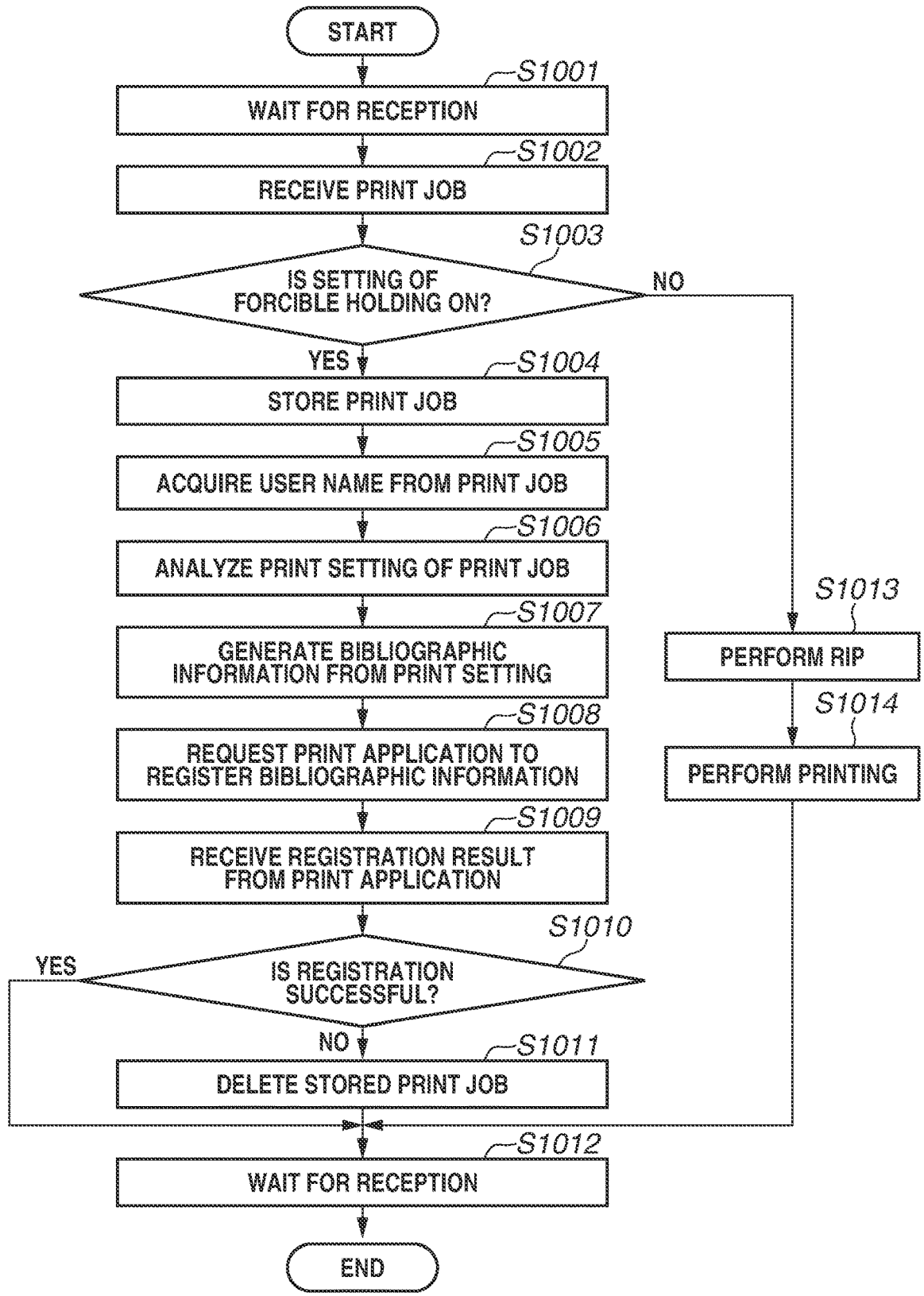

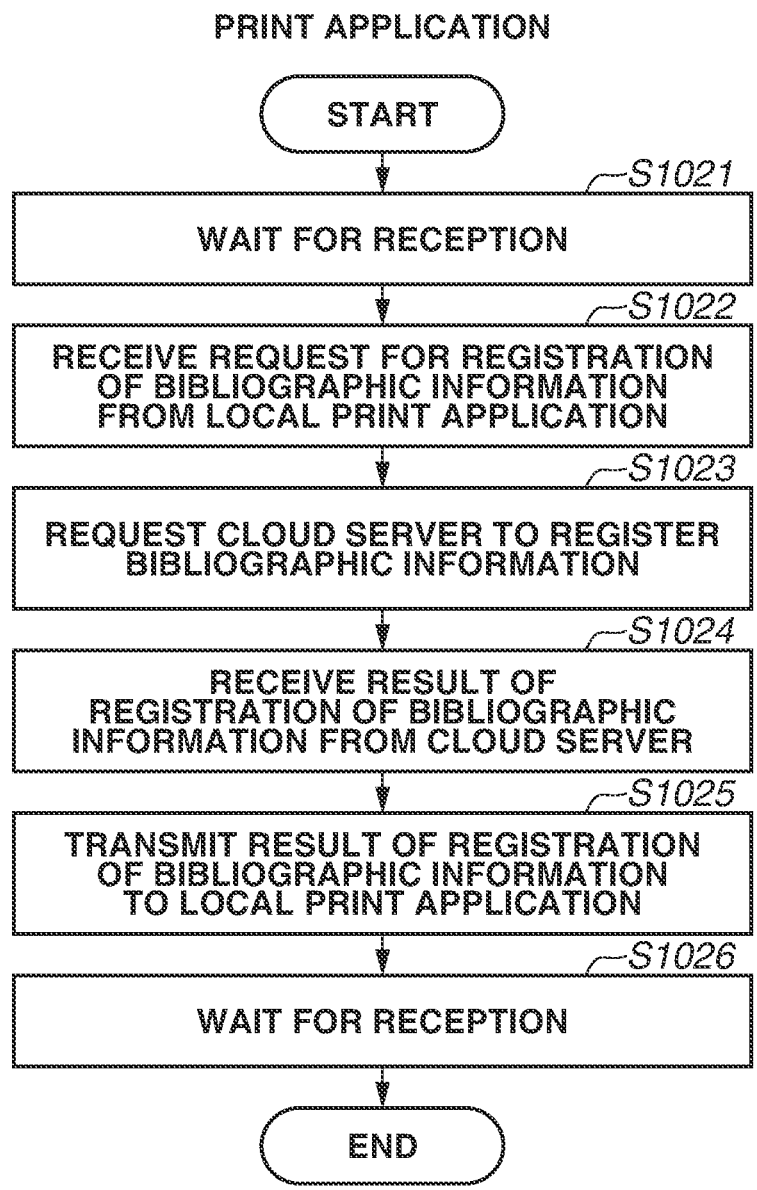

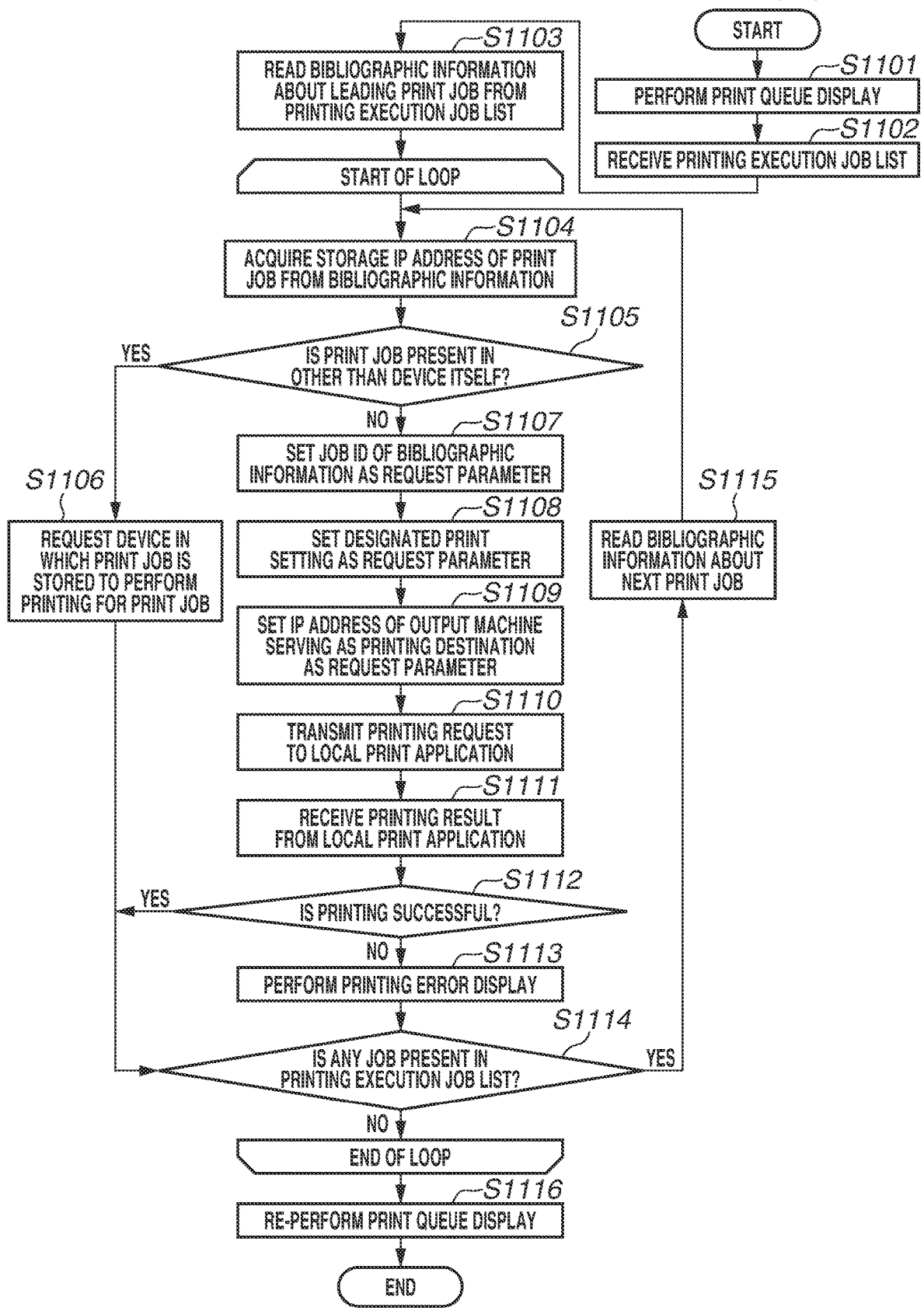

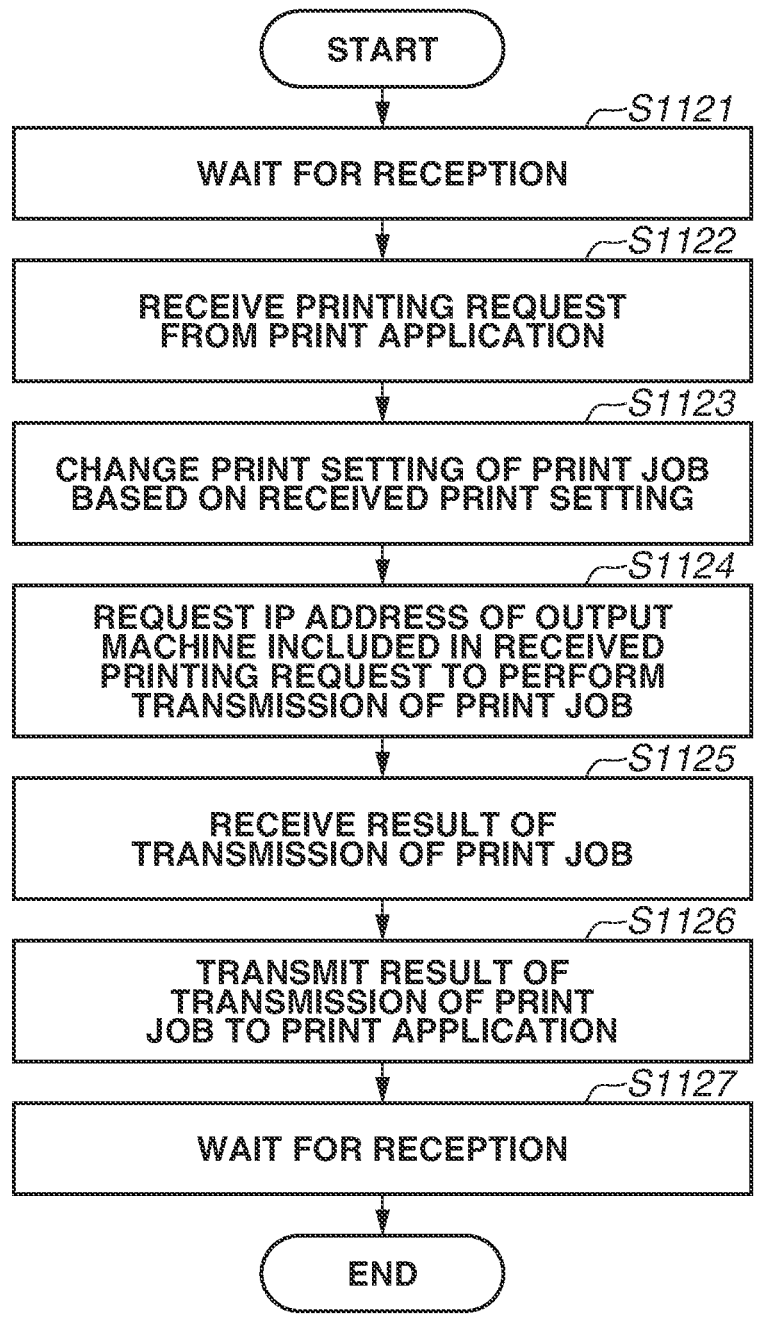

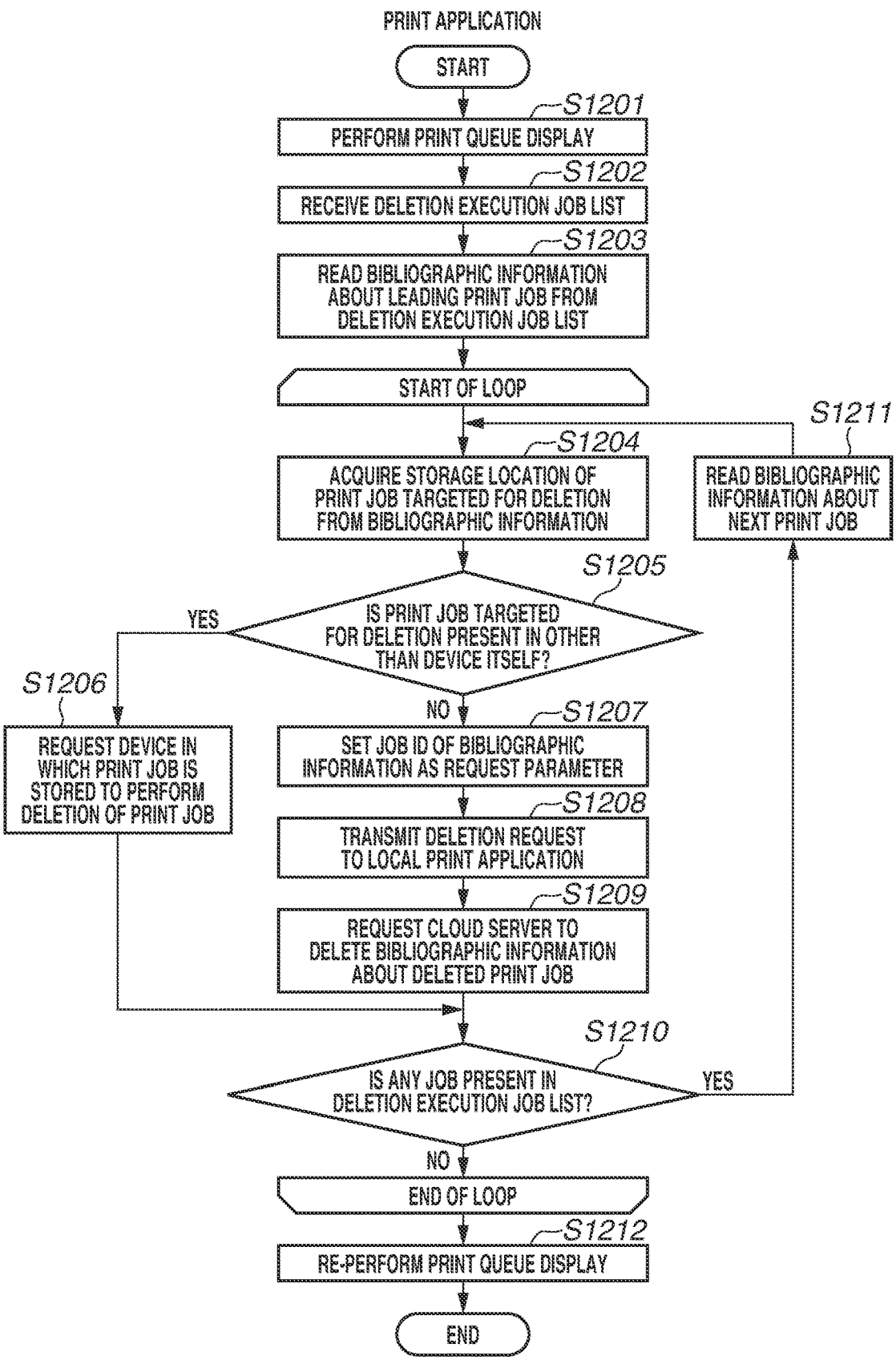

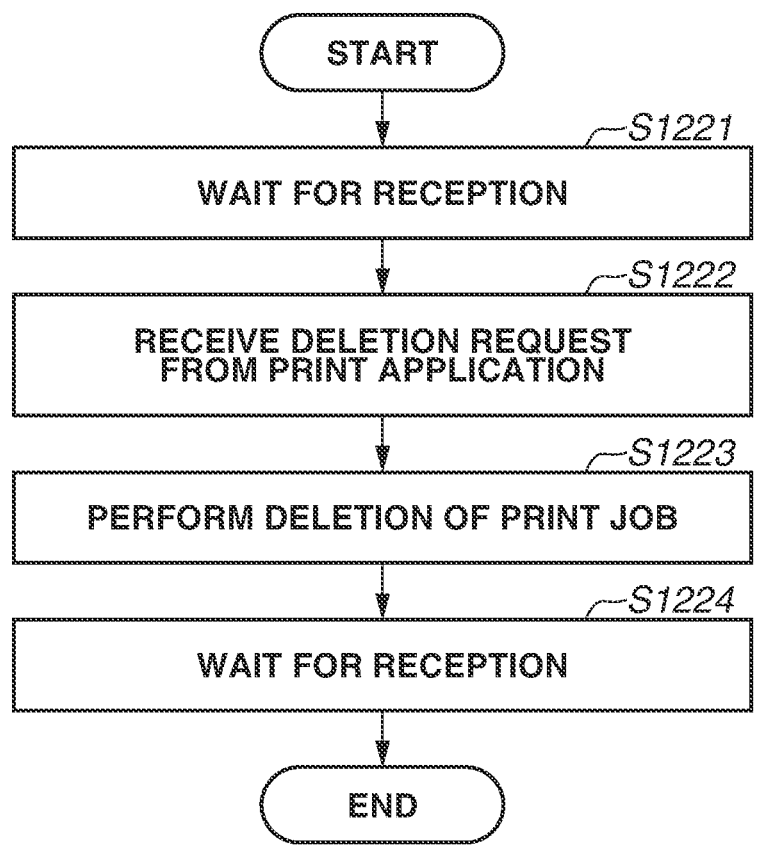

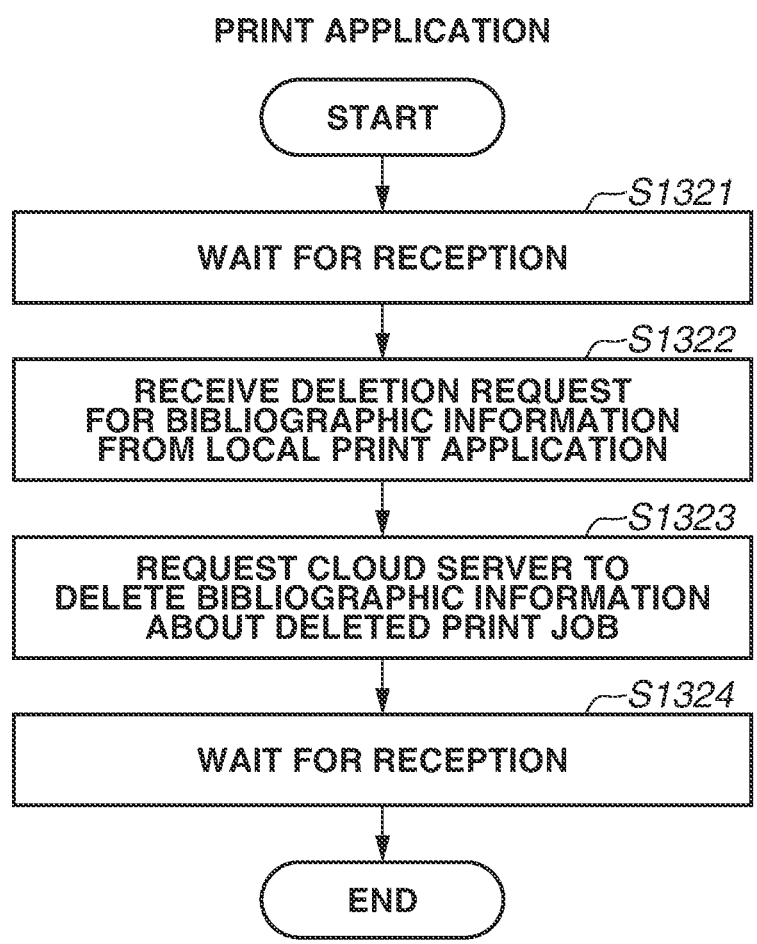

IMAGE FORMING APPARATUS AND CONTROL METHOD THEREFOR

BACKGROUND

Field

Aspects of the present disclosure generally relate to an application for use in an image forming apparatus.

Description of the Related Art

A conventional copying machine has been configured to immediately perform printing upon receiving a print job from a terminal apparatus such as a personal computer (PC). In this case, it is likely that information leakage occurs due to the user forgetting to pick up a printed product or a third person looking at an unattended printed product. Therefore, recently, for the purpose of confidentiality protection, Japanese Patent Application Laid-Open No. 2007-251279 has proposed hold printing (stored job print), which, upon receiving a print job, without immediately performing printing, holds (stores) the print job in a non-volatile storage region in a multifunction peripheral and, after that, performs printing in response to a printing instruction issued by the user on an operation unit of the multifunction peripheral. In the case of this configuration, previously installing, on the multifunction peripheral, an application for implementing hold printing (a local print application) enables implementing local printing.

Moreover, most recently, remote printing, which allows any multifunction peripheral to perform printing for the held (stored) print job, has become available. Examples of a configuration of remote printing include a configuration which holds a print job in a terminal apparatus such as a PC and causes a multifunction peripheral to acquire the print job held in the terminal apparatus and perform printing for the acquired print job. In the case of this configuration, it is necessary to previously install, on a PC, an application for holding a print job in the terminal apparatus (a PC application). Moreover, it is also necessary to previously install, on a multifunction peripheral, an application for acquiring a print job held in the terminal apparatus and performing printing for the acquired print job (a remote print application, hereinafter referred to as a "print application").

SUMMARY

As another configuration of remote printing, a configuration which holds a print job in a multifunction peripheral and, at the time of execution of remote printing, acquires a print job held in another multifunction peripheral and performs printing for the acquired print job is conceivable. In the case of this configuration, a hold printing function included in the local print application is provided as a library and is then used by the print application, so that remote printing can be implemented. However, the local print application has an application setting which the local print application applies when operating as an application. Therefore, a remote printing function aimed at by another application is not able to be implemented only by the print application simply using a library function of the local print application.

Aspects of the present disclosure generally feature providing a technique which, even in a case where an application uses a library function of another application, is able to execute the application while applying a desired setting.

According to an aspect of the present disclosure, an image forming apparatus includes a setting unit configured to set a setting value about an operation of a first application, an execution unit configured to execute the first application with use of the set setting value, a holding unit configured to hold another setting value for a library which is used when a function of the first application is provided as the library, and a changing unit configured to change the set setting value to the held setting value for the library when the function of the first application is provided as the library.

Further features of the present disclosure will become apparent from the following description of exemplary embodiments with reference to the attached drawings.

BRIEF DESCRIPTION OF THE DRAWINGS

FIG. 4 is a block diagram illustrating a software configuration of a cloud server.

FIGS. 6A and 6B are diagrams illustrating examples of application settings of a local print application for the multifunction peripheral.

FIG. 8 is a diagram illustrating the substance of bibliographic information which is stored in the cloud server.

FIG. 9A is a flowchart illustrating an example of a setting procedure of the cloud server. FIGS. 9B and 9C are flowcharts each illustrating an example of a setting procedure of the multifunction peripheral.

FIGS. 10A and 10B are flowcharts each illustrating an example of an entry processing procedure of the multifunction peripheral (entry machine).

FIGS. 11A and 11B are flowcharts each illustrating an example of a print processing procedure of the multifunction peripheral (output machine).

FIGS. 12A and 12B are flowcharts each illustrating an example of a deletion processing procedure of the multifunction peripheral (output machine).

FIGS. 13A and 13B are flowcharts each illustrating an example of a periodic deletion processing procedure of the multifunction peripheral (entry machine).

DESCRIPTION OF THE EMBODIMENTS

Figure 1:
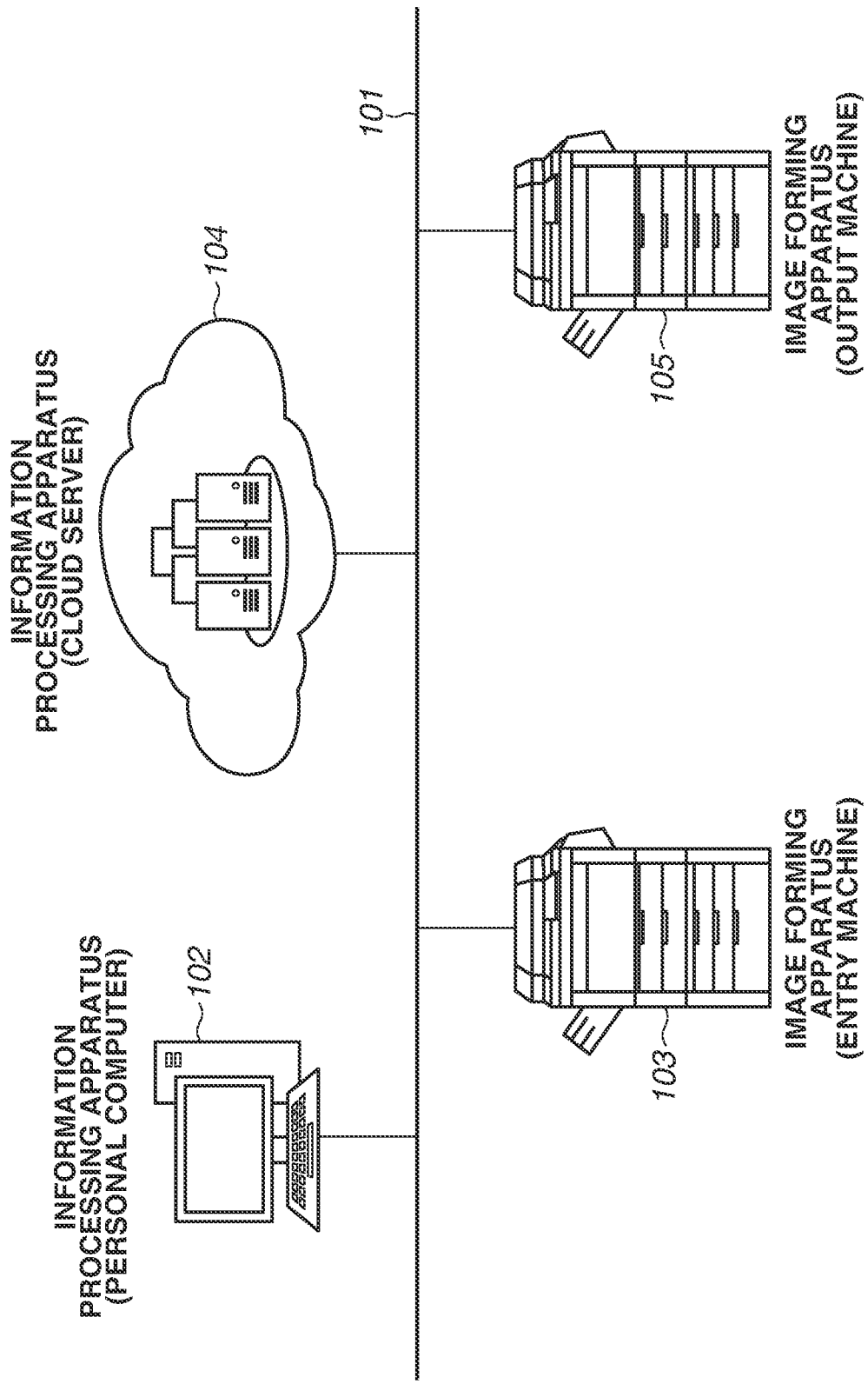
FIG. 1 is a diagram illustrating an example of a network configuration.

Various exemplary embodiments, features, and aspects of the present disclosure will be described in detail below with reference to the drawings.

In an exemplary embodiment of the present disclosure, the following series of processing operations performed when the user performs remote printing in a printing system is described.

The user (preferably, the administrator user) operates an information processing apparatus (personal computer) 102 to display a setting screen for various functions which a cloud server (server) 104 provides. The user (preferably, the administrator user) operates the setting screen to perform pre-setting for performing remote printing.

The user (general user) operates the information processing apparatus 102 to transmit a print job to a multifunction peripheral (image forming apparatus) 103 serving as an entry machine. The multifunction peripheral 103 stores the print job in a hard disk drive (HDD) 204, generates bibliographic information from the print job, and transmits the generated bibliographic information to the cloud server 104. The cloud server 104 performs management of the bibliographic information.

The user (general user) operates a multifunction peripheral 105 serving as an output machine to perform user authentication, and then starts the following processing for remote printing. The multifunction peripheral 105 acquires bibliographic information about the authenticated user from the cloud server 104 and displays a print queue 510.

The authenticated user operates a screen for the print queue 510 to issue an instruction to change a print setting or perform printing for a print job or delete a print job. In a case where the instruction issued by the authenticated user is directed to printing, the multifunction peripheral 105 transmits a printing instruction to the multifunction peripheral 103, the multifunction peripheral 103 transmits a print job to the multifunction peripheral 105, and then, the multifunction peripheral 105 performs printing for the print job. In a case where the instruction issued by the authenticated user is directed to deletion, the multifunction peripheral 105 transmits an instruction for deletion of a print job to the multifunction peripheral 103, and then, the multifunction peripheral 103 deletes the print job. Moreover, the multifunction peripheral 103 transmits information about the deleted bibliographic information to the cloud server 104.

The multifunction peripheral 103 periodically checks print jobs stored in the HDD 204, and, in a case where there is a print job the storage period of which has expired, the multifunction peripheral 103 deletes the print job. Moreover, the multifunction peripheral 103 transmits information about the deleted bibliographic information to the cloud server 104.

Thus, it becomes unnecessary for the user to previously install, on a PC, an application for holding (storing) a print job in a terminal apparatus (PC application). Moreover, a function included in a local print application installed on a multifunction peripheral is able to be provided as a library. Moreover, a print application is able to use such a function to implement a remote printing function, so that the remote printing function can be provided to the user.

<Network Configuration of Printing System>

FIG. 1 is a diagram illustrating a network configuration to which a multifunction peripheral serving as an image forming apparatus on which an application according to the present exemplary embodiment is able to be installed and a cloud server serving as an information processing apparatus can be applied. Referring to FIG. 1, the network configuration includes a network 101, which supports, for example, the Transmission Control Protocol/Internet Protocol (TCP/IP). The information processing apparatus 102 serving as an information processing apparatus, the cloud server 104, and the multifunction peripherals (image forming apparatuses) 103 and 105 are connected to the network 101.

The multifunction peripheral 103 is an entry machine which, upon receiving a print job from the information processing apparatus 102, stores the print job in the case of using a remote printing function. The multifunction peripheral 103 generates bibliographic information from the received print job and transmits the bibliographic information to the cloud server 104.

The cloud server 104 unifies management of pieces of bibliographic information about print jobs stored by all of the multifunction peripherals which are registered on the same network 101. With regard to an information processing apparatus which manages bibliographic information, while a configuration in which the multifunction peripheral 103 or 105 performs management of bibliographic information is conceivable, advantages receivable by the cloud server 104 performing management of bibliographic information are the following three points.

It is possible to maintain a response performance even at the time of concentration of processing load.

It is easy to extend the upper limit of bibliographic information.

It is possible to reduce downtime as a result of operating as a bibliographic management server.

In a case where bibliographic information management is performed by a multifunction peripheral, since the multifunction peripheral itself has copying and scanning functions, when operation competition with a management function for bibliographic information occurs or requests for the bibliographic information management function concentrate on a server, the response performance for the bibliographic information management may decrease.

Moreover, in a case where a multifunction peripheral is used as a bibliographic management server, since a resource for persistent storage capacity, such as an HDD, is limited, the extensibility of the upper limit of manageable bibliographic information is poor.

Additionally, in a case where a multifunction peripheral is used as a bibliographic management server, since, in some cases, the multifunction peripheral is in a power-off state, some downtime may occur as a result of operating as a bibliographic management server.

These issues can be solved by using a cloud server to manage bibliographic information.

The multifunction peripheral 105 receives authentication information from the user to perform authentication. The multifunction peripheral 105 is an output machine which, after performing user authentication, acquires bibliographic information based on the authentication information received from the cloud server 104, receives a print job from the entry machine 103 based on the acquired bibliographic information, and performs printing based on the received print job.

The above-mentioned configuration is illustrated as a general configuration for ease of explanation, and a plurality of information processing apparatuses 102 or a plurality of multifunction peripherals 103 or 105 can be provided. Moreover, any of the multifunction peripherals 103 and 105 can operate as an entry machine or an output machine. In other words, each of the multifunction peripherals registered in the present printing system can operate both as an entry machine and an output machine. The multifunction peripheral 103 or 105 can be a printer 103 or 105 which does not have multiple functions such as scanning and copying functions but only has a printing function.

<Outline Configurations of Multifunction Peripherals 103 and 105>

Figure 2:
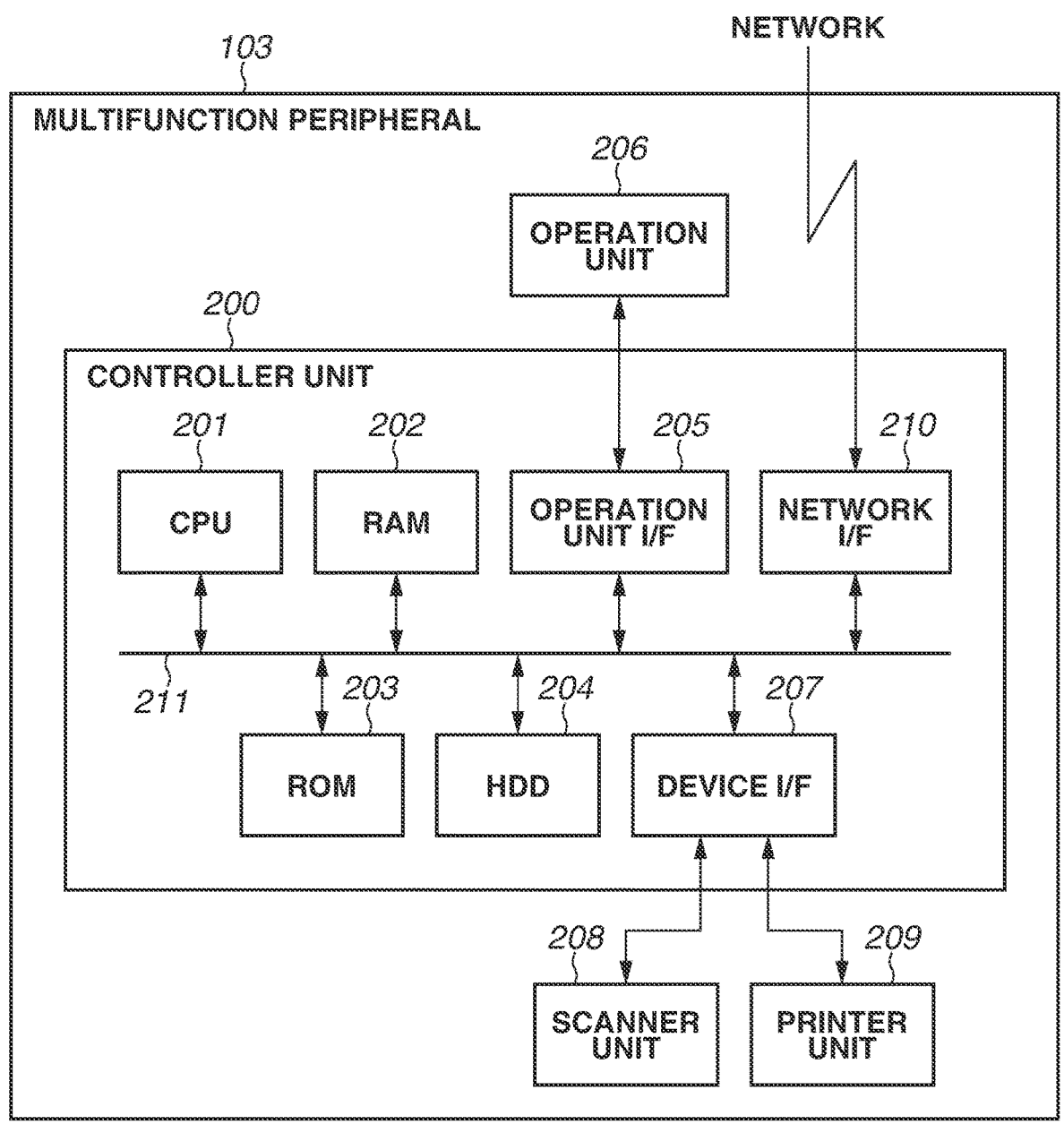
FIG. 2 is a block diagram illustrating an outline configuration of a multifunction peripheral.

FIG. 2 is a block diagram illustrating an outline configuration of each of the multifunction peripherals 103 and 105 according to the present exemplary embodiment. In FIG. 2, the multifunction peripheral 103 is described as a typical example for ease of explanation.

Referring to FIG. 2, the multifunction peripheral 103 includes a controller unit 200, an operation unit 206, a scanner unit 208, and a printer unit 209.

The controller unit 200 is a device which controls a multifunction peripheral or a printer. The controller unit 200 includes a central processing unit (CPU) 201, a random access memory (RAM) 202, a read-only memory (ROM) 203, an HDD 204, an operation unit interface (I/F) 205, a device I/F 207, and a network I/F 210, which are interconnected via a system bus 211.

The CPU 201 comprehensively controls the respective units connected to the system bus 211, thus controlling the entire multifunction peripheral (image forming apparatus) 103. The RAM 202 has, stored therein, programs such as an operating system, system software, and application software and data therefor. The ROM 203 has, stored therein, a boot program for the system, a system program, and an application program. Additionally, the ROM 203 may have, stored therein, information required for an image forming apparatus, such as font data. The HDD 204 is a hard disk drive in which to store, for example, an operating system, system software, application software, image data, setting data, and a print job. The programs stored in the RAM 202 are executed by the CPU 201 to process image data or pieces of data other than image data stored in the RAM 202, the ROM 203, or the HDD 204. Moreover, a small-sized multifunction peripheral may be configured not to include the HDD 204 and configured to store, for example, system software and application software in the ROM 203. Alternatively, the multifunction peripheral 103 can be configured to include, instead of the HDD 204, a storage device other than a hard disk drive, such as a solid-state disk (SSD) using flash memory.

The operation unit I/F 205 is an interface unit operating with respect to the operation unit 206, which includes a touch panel, and outputs, to the operation unit 206, image data to be displayed on the operation unit 206. Moreover, the operation unit I/F 205 communicates, to the CPU 201, information input by the user via the operation unit 206. Furthermore, instead of performing displaying on the operation unit 206, performing display control in such a way as to perform displaying on a display unit can be employed.

The device I/F 207 interconnects the scanner unit 208 and the printer unit 209, which are image input and output devices, and the controller unit 200, and performs inputting and outputting of image data. Image data input from the scanner unit 208 via the device I/F 207 is stored in the RAM 202 or the HDD 204. The stored image data is subjected to, for example, image processing as needed by an application program stored in the RAM 202. Moreover, image data is output to the printer unit 209 via the device I/F 207. The network I/F 210 connects to a network and performs inputting and outputting of image data with respect to an external device on the network or inputting and outputting of information for controlling a multifunction peripheral.

As long as even a configuration which is not illustrated in FIG. 2 satisfies an advantageous effect of the present exemplary embodiment, the present exemplary embodiment is naturally not limited to the configuration illustrated in FIG. 2. For example, in the case of a multifunction peripheral having a facsimile (FAX) function, an I/F directed to a modem device, which is not illustrated in FIG. 2, can be included in the controller unit 200, and the multifunction peripheral can connect to a public line via the modem device and can perform FAX transmission. Alternatively, for example, to enable reading out and printing data stored in, for example, a flash memory card, the controller unit 200 can include a Universal Serial Bus (USB) I/F (not illustrated).

<Software Configuration of Each of Multifunction Peripherals 103 and 105>

Figure 3:
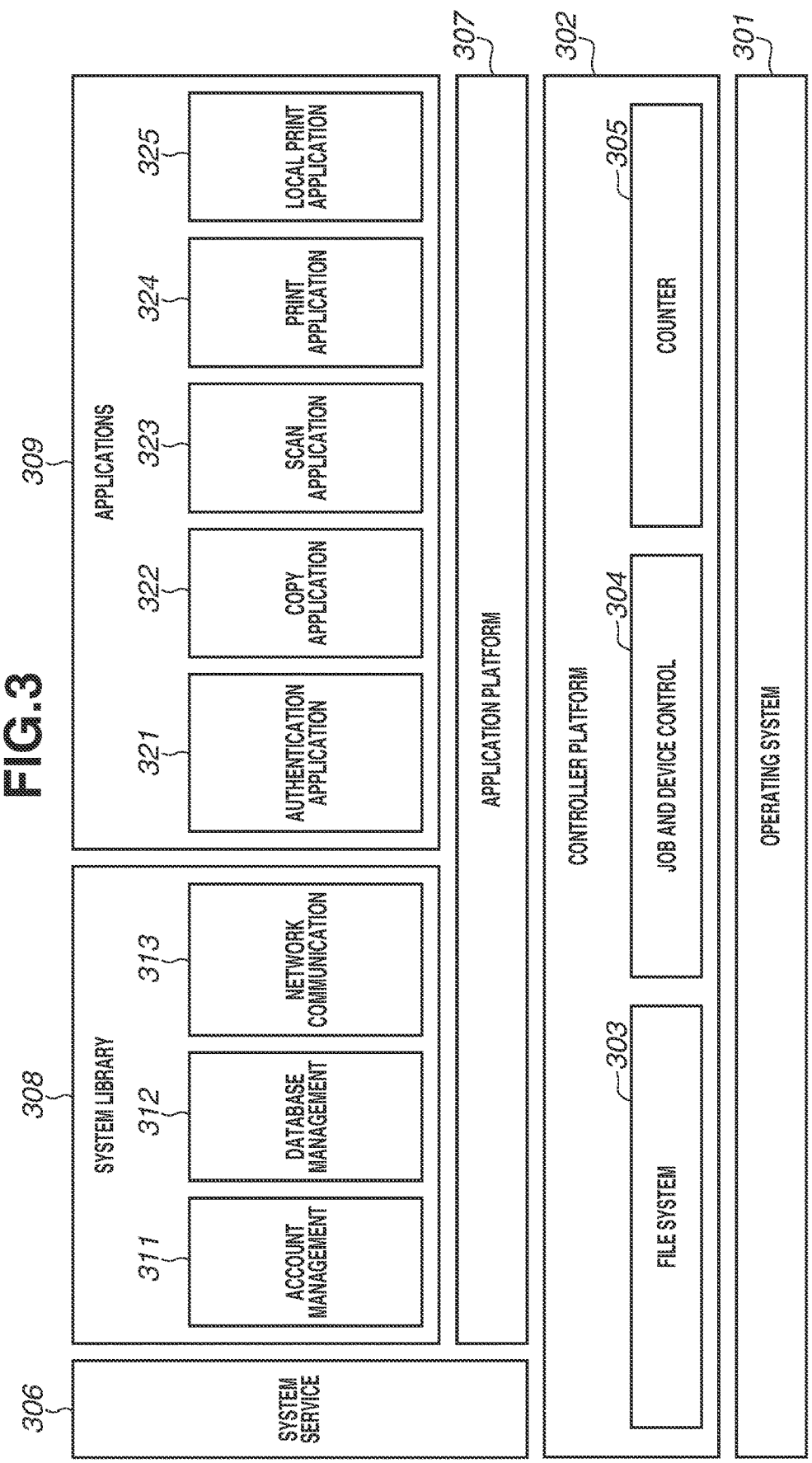
FIG. 3 is a block diagram illustrating a software configuration of the multifunction peripheral.

FIG. 3 is a block diagram illustrating a software configuration of each of the multifunction peripherals 103 and 105 according to the present exemplary embodiment, which is implemented in the controller unit 200. Software which is incorporated in a multifunction peripheral or a printer and processed by the controller unit 200 is implemented as what is called firmware and is executed by the CPU 201.

An operating system 301 provides various services for resource management and frameworks thereof optimized for control of an embedded system on behalf of software operating thereon. The various services for resource management and frameworks thereof which the operating system 301 provides include multitasking management, which causes a plurality of processing operations to substantially operate in parallel by managing a plurality of execution contexts for processing to be performed by the CPU 201. Moreover, the various services for resource management and frameworks thereof which the operating system 301 provides include inter-task communication, which implements synchronization and data exchange between tasks. Additionally, the operating system 301 also provides, for example, memory management, interrupt management, various device drivers, and a protocol stack in which processing operations of various protocols of, for example, a local interface, a network, and a communication are implemented.

A controller platform 302 includes a file system 303, a job and device control 304, and a counter 305. The file system 303 is a mechanism used to store data constructed on a storage device such as the HDD 204 or the RAM 202, and is used to spool a job which the controller unit 200 handles and to store various pieces of data. The job and device control 304 controls hardware of a multifunction peripheral or a printer and further controls a job which uses basic functions which hardware mainly provides (for example, printing, scanning, communication, and image conversion). The counter 305 manages an expiration date of each application and a counter value that is based on use results of printing and scanning.

A system service 306 is a module used to monitor the operational status of a multifunction peripheral or a printer and to download software or a license from a software delivery server via a network.

An application platform 307 is middleware which enables mechanisms of the operating system 301 and the controller platform 302 to be used by a system library 308 and applications 309, which are described below.

The system library 308 is a software module which provides the function of a service which is able to be used by the applications 309, and includes account management 311, database management 312, and network communication 313.

The applications 309 are a software module which is able to perform menu displaying on the operation unit 206 and to receive inputting from the user and provides various functions which a multifunction peripheral or a printer implements to the user.

An authentication application 321 is one of the applications 309 and manages users who are allowed to use the multifunction peripheral 103 or 105 with use of the account management 311 included in the system library 308. The account management 311 communicates with an authentication application 410 described below of the cloud server 104 with use of the network communication 313, thus performing user authentication. The authentication application 321 performs matching of a user name and a password input via the operation unit 206 while communicating with the authentication application 410, thus performing authentication of a user.

A copy application 322 is one of the applications 309 and accesses the job and device control 304 via the application platform 307 to provide a copying function for paper documents. A scan application 323 is one of the applications 309 and accesses the job and device control 304 via the application platform 307 to provide a function of scanning and converting a paper document into electronic data.

A local print application 325 is one of the applications 309 and provides a hold printing function (local print function) which includes, for example, holding of a received print job, document list displaying, printing, deletion, and periodic deletion. The local print application 325 provides, as a library, the function of holding, printing, and deletion of a print job which belongs to the local print application 325 itself, and enables such a function to be used by a print application 324 described below. Moreover, the local print application 325 provides, as a library, the function of starting and ending of a service, updating of application setting of, for example, a storage period, notification of bibliographic information generated from print data, and notification of a periodic deletion execution result.

The print application 324 is one of the applications 309 and provides a remote printing function (remote print function) with use of the library function which the local print application 325 provides. The print application 324 communicates with the cloud server 104 with use of the network communication 313 and executes a starting and ending function for a service serving as a library provided by the local print application 325 based on the acquired remote printing setting. The print application 324 communicates with the cloud server 104 with use of the network communication 313 and performs displaying or setting change of a print queue based on the acquired bibliographic information.

The print application 324 performs printing and deletion functions provided by the local print application 325 based on a user operation. The print application 324 communicates with the cloud server 104 with use of the network communication 313 based on a notification of bibliographic information of a held print job received from the local print application 325 and performs registration of the bibliographic information. The print application 324 communicates with the cloud server 104 with use of the network communication 313 based on a notification of a periodic deletion execution received from the local print application 325 and performs deletion of the bibliographic information.

In the present exemplary embodiment, the print application 324 performs the functions of holding of a print job, printing, and deletion with use of libraries provided by the local print application 325, and does not have the functions of holding of a print job, printing, and deletion.

<Software Configuration of Cloud Server 104>

FIG. 4 is a block diagram illustrating a software configuration of the cloud server 104 according to the present exemplary embodiment, which is implemented in the cloud server 104.

An infrastructure 401 is an underlying base on which the cloud server 104 provides a service, and is configured with a server, a virtual machine, a storage, a network, and an operating system.

A cloud platform 402 is a framework which provides a common basic function to applications 407 with use of an infrastructure 401, and includes a file system 403, account and job control 404, and a database 405.

The applications 407 are able to communicate with a web browser operating in the information processing apparatus 102 and to perform menu displaying on the web browser screen of the information processing apparatus 102 and receive inputting from the user. The applications 407 are a software module which provides, to the user, various functions of managing user accounts which are allowed to use a multifunction peripheral or a printer, visualizing usage statistics of the multifunction peripheral or the printer, and using the multifunction peripheral or the printer.

The authentication application 410 is one of the applications 407 and manages users who are allowed to use the multifunction peripheral 103 or 105 with use of the account and job control 404 included in the cloud platform 402. The authentication application 410 receives, via a network, user information for which an authentication request is issued from the authentication application 321 of the multifunction peripheral 103 or 105 and then performs matching of a user name and a password. User authentication can be performed not by using the account and job control 404 included in the cloud platform 402 but by using, for example, an external authentication server using, for example, the Active Directory or the Lightweight Directory Access Protocol (LDAP).

A device management application 411 is one of the applications 407 and performs device management such as registration, editing, and deletion of the multifunction peripheral 103 or 105 which is targeted for connection.

A setting application 412 is one of the applications 407 and performs setting of a function which the cloud server 104 provides to the user.

A bibliographic management application 413 is one of the applications 407 and manages bibliographic information which is available for printing by the multifunction peripheral 103 or 105 registered by the device management application 411 for each user registered by the authentication application 410. The bibliographic information is management information about a print job input to a multifunction peripheral, such as a job identifier (ID) of a print job, reception date and time thereof, an IP address and directory path of a multifunction peripheral in which a print job is stored, a job name, and a print setting.

A usage statistical application 414 is one of the applications 407 and displays statistical information about usage results of functions such as printing and scanning. The statistical information is displayed on a web browser screen of the information processing apparatus 102 for each of the multifunction peripherals 103 and 105 registered by the device management application 411 or for each user registered by the authentication application 410.

<Top Menu Screen of Multifunction Peripheral>

Figure 5A:
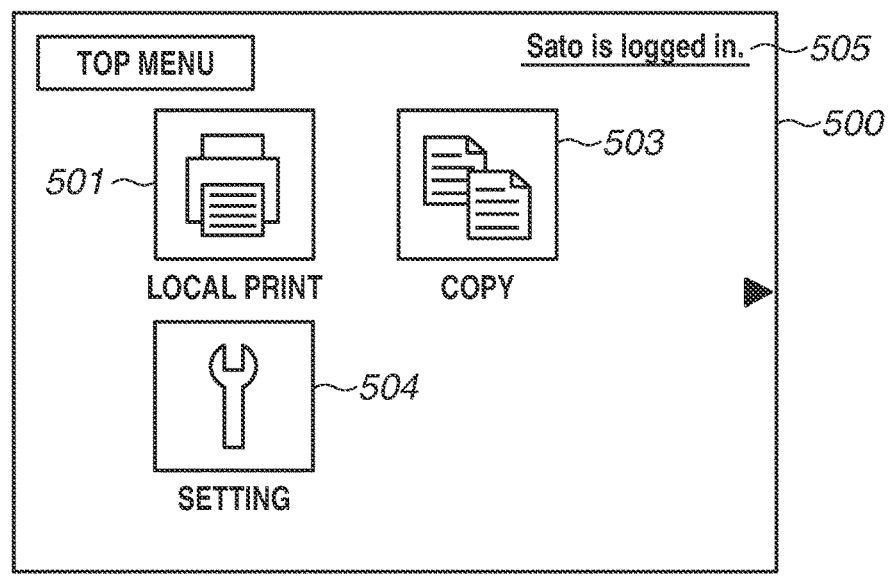
FIGS. 5A, 5B, 5C, 5D, 5E, and 5F are diagrams illustrating examples of screens each of which is displayed on an operation unit of the multifunction peripheral.

FIG. 5A illustrates an example of a top menu screen in the multifunction peripheral 105 serving as an output machine according to the present exemplary embodiment. The top menu screen is displayed on the operation unit 206 of the multifunction peripheral 105. The screen illustrated in FIG. 5A is a display screen which is displayed when the local print application 325 has not yet started providing a function as a library.

When the user logs in to the multifunction peripheral 105 via, for example, an integrated circuit (IC) card, a top menu 500 is displayed after login, so that it becomes possible for the user to select an application which the user uses in the multifunction peripheral 105 from the top menu 500. Since the user is logged in to the multifunction peripheral 105, a login user name 505 is displayed in the screen. FIG. 5A illustrates an example of a screen in which the user name "Sato" is displayed during login.

The applications 309 installed on the multifunction peripheral 105 are displayed as icons in the top menu 500. A local print icon 501 is an icon for the local print application 325, and, when the local print icon 501 is pressed, the local print application 325 is activated.

A copy icon 503 is an icon for the copy application 322, and, when the copy icon 503 is pressed, the copy application 322 is activated. A setting icon 504 is an icon for an application which is one of the applications 309 and performs setting about the multifunction peripheral 105.

Furthermore, in the present exemplary embodiment, in a case where the local print application 325 has started providing a function as a library, the local print application 325 is caused not to operate as an application. Therefore, in a case where the local print application 325 has started providing a function as a library, the local print icon 501 is not displayed and, instead, a print icon 502 is displayed. FIG. 5E illustrates an example of a top menu screen which is displayed in this state. The screen illustrated in FIG. 5E is a display screen which is displayed when the local print application 325 has started providing a function as a library.

The print icon 502 is an icon for the print application 324, and, when the print icon 502 is pressed, the print application 324 is activated.

In the present exemplary embodiment, in a case where the local print application 325 is providing a function as a library, the local print icon 501 is not displayed, so that it becomes unnecessary to perform control such as control for switching setting of applications.

<Description of Print Queue Display Screen for Local Print>

Figure 5B:
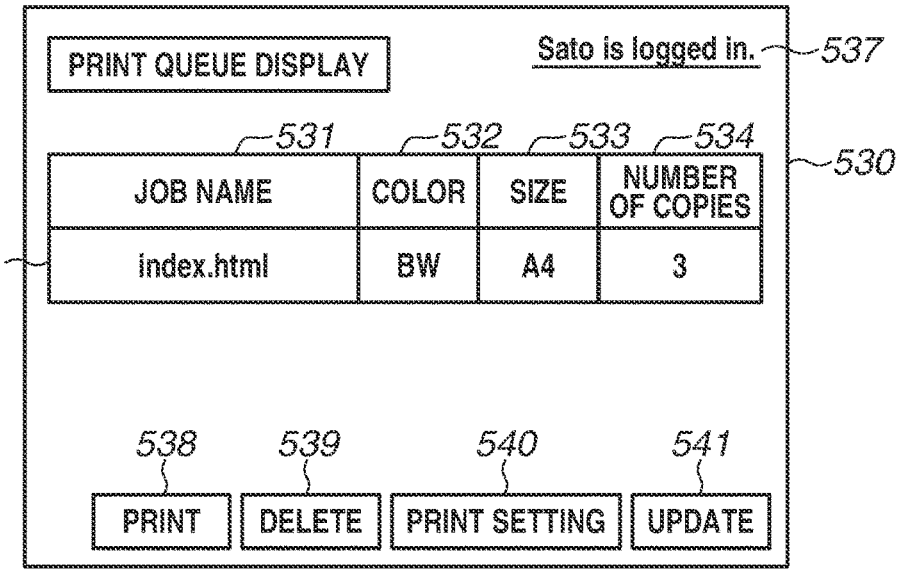

FIG. 5B illustrates an example of a print queue display screen in the multifunction peripheral 105 serving as an output machine according to the present exemplary embodiment. The print queue display screen is displayed on the operation unit 206 by the local print application 325, which is executed by the CPU 201 of the multifunction peripheral 105. In the print queue display screen, a list of print jobs which have been held in the multifunction peripheral 105 owned by the authenticated user is displayed.

In FIG. 5B, a print queue display screen 530 for the local print application 325, which is displayed in response to the local print icon 501 being pressed, is illustrated. FIG. 5B illustrates an example of a screen in which the user name "Sato" is displayed during login. With respect to each print job, a job name 531, color and monochrome setting 532, paper size 533, and the number of copies 534 are displayed. In this screen, there is one print job which is able to be operated (job 535). The local print application 325 displays the print queue display screen 530 based on bibliographic information generated from a print job held in the multifunction peripheral 105. With respect to such a print job, a print button 538, a deletion button 539, and a print setting button 540 are displayed, so that, when the user selects a desired print job from among displayed print jobs and presses any of such buttons, an operation is performed on the targeted print job. An indication 537 indicates the logged-in user. When an update button 541 is pressed by the user, the local print application 325 of the multifunction peripheral 105 re-acquires bibliographic information generated from a print job held in the multifunction peripheral 105 and updates displaying of a list of print jobs based on the acquired bibliographic information.

<Description of Print Queue Display Screen for Remote Print>

Figure 5C:
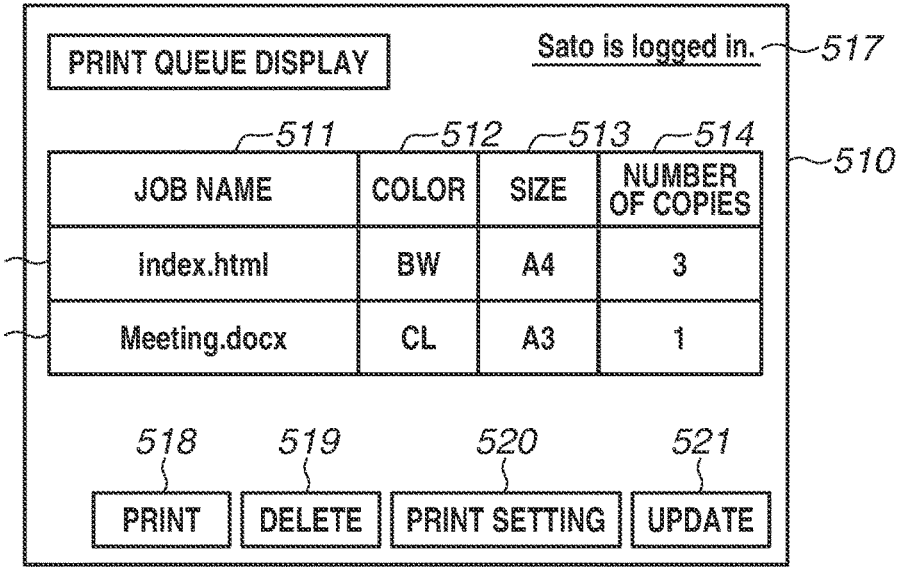

FIG. 5C illustrates an example of a print queue display screen in the multifunction peripheral 105 serving as an output machine according to the present exemplary embodiment. The print queue display screen is displayed on the operation unit 206 by the print application 324, which is executed by the CPU 201 of the multifunction peripheral 105. In the print queue display screen, a list of print jobs which belong to the authenticated user is displayed.

In FIG. 5C, a print queue display screen 510 for the print application 324, which is displayed in response to the print icon 502 being pressed, is illustrated. FIG. 5C illustrates an example of a screen in which the user name "Sato" is displayed during login. With respect to each print job, a job name 511, color and monochrome setting 512, paper size 513, and the number of copies 514 are displayed. In this screen, there are two print jobs which are able to be operated (jobs 515 and 516). The print application 324 acquires bibliographic information about "Sato", who is a logged-in user, from the cloud server 104, which manages bibliographic information, and displays the acquired bibliographic information in the print queue display screen 510. With respect to such print jobs, a print button 518, a deletion button 519, and a print setting button 520 are displayed, so that, when the user selects a desired print job from among displayed print jobs and presses any of such buttons, an operation is performed on the targeted print job. An indication 517 indicates the logged-in user. When an update button 521 is pressed by the user, the print application 324 of the multifunction peripheral 105 re-acquires bibliographic information about "Sato", who is a logged-in user, from the cloud server 104 and updates displaying of a list of print jobs based on the acquired bibliographic information.

<Description of Print Setting Screen>

Figure 5D:
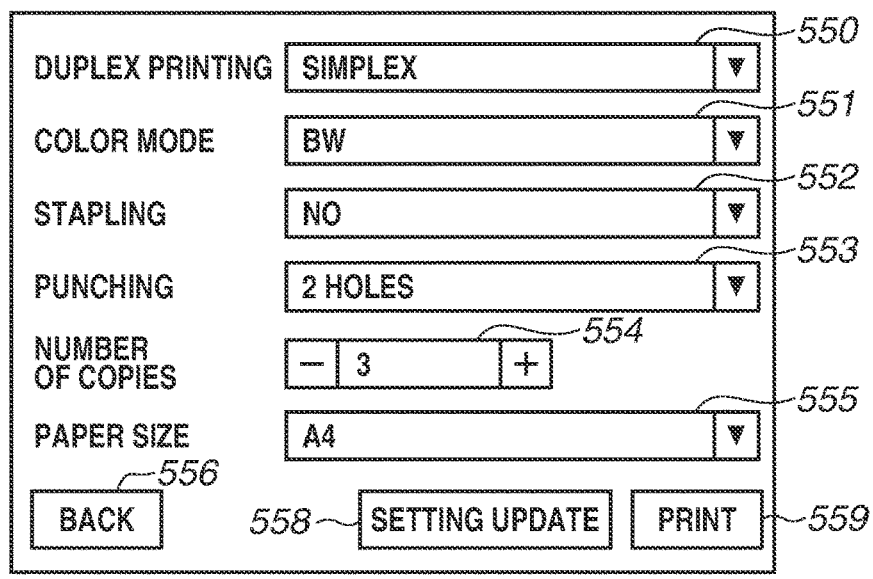
Figure 5E:
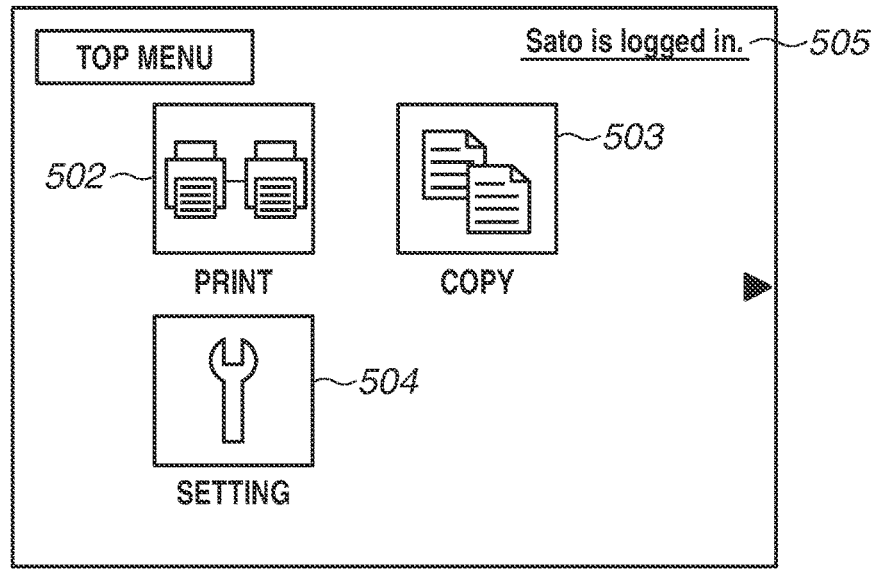

FIG. 5D illustrates a print setting screen which is displayed in response to the print setting button 520 being pressed. With respect to a print job selected in the print queue display screen 510, a print setting is able to be changed to be updated, and an operation for printing is also able to be performed. The current setting values are displayed in setting of duplex printing 550, setting of color mode 551, setting of stapling 552, setting of punching 553, setting of the number of copies 554, and setting of paper size 555. The user is allowed to select a print setting from among the displayed settings and change the setting value thereof. Even after a print setting is changed, when the user presses a back button 556, changing of the print setting is canceled. When, after changing the setting value, the user presses a setting update button 558, the print application 324 updates the bibliographic information with the changed print setting and then requests the cloud server 104 to update the bibliographic information. When, after changing the setting value, the user presses a print button 559, the print application 324 performs printing for the target print job with the changed print setting. After that, the print application 324 updates the bibliographic information with the changed print setting and then requests the cloud server 104 to update the bibliographic information.

<Description of Application Setting>

FIG. 6A illustrates an example of an application setting 600 which is applied when the local print application 325 operates as an application. For example, in the application setting 600, setting of forcible holding 601 is set to OFF. Storage period of job 602 is set to one hour. Besides these, settings 603 to 612 are set to those illustrated in FIG. 6A. The application setting 600 displays a setting change screen (not illustrated) on the operation unit 206 and allows a setting value to be changed based on a user operation.

FIG. 6B illustrates an example of an application setting 620 which is applied when the local print application 325 provides a library function. For example, in the application setting 620, setting of forcible holding 621 is set to ON. Storage period of job 622 is set to 10 hours. Besides these, settings 623 to 632 are set to those illustrated in FIG. 6B. The application setting 620 is able to be operated in the screen of the cloud server 104. The present screen is displayed on a web browser operating in the information processing apparatus 102 by the web browser of the information processing apparatus 102 communicating with the cloud server 104.

Furthermore, the reason why an application setting which is applied when the local print application 325 operates as an application and an application setting which is applied when the local print application 325 provides a library function are set independently of each other is as follows.

The local print application setting includes forcible holding setting. This enables setting whether to forcibly hold a print job received by the local print application 325. In a case where the setting value of forcible holding is ON, the print job is forcibly held, and, in a case where the setting value of forcible holding is OFF, the print job is not held and printing therefor is immediately performed. In a case where holding setting is set to OFF, since the holding function of the local print application 325 is not able to be used, it is impossible to implement the remote printing function. Specifically, forcible holding setting which is applied when the local print application 325 operates as an application is assumed to be OFF. However, forcible holding setting which is applied when the local print application 325 provides a library function has to be set to ON so as to implement the remote printing function.

Moreover, setting of, for example, a storage period of job may be desired to be changed between the intended use of the local printing function and the intended use of the remote printing function. Specifically, a storage period of job which is applied when the local print application 325 operates as an application is assumed to be one hour. However, a storage period of job which is applied when the local print application 325 provides a library function is assumed to be 10 hours. In a case where the cloud server 104 sets a storage period of bibliographic information as 10 hours, it is favorable to align the storage period of bibliographic information and the storage period of job with each other. This setting is configured to prevent such a situation that, while the storage period of bibliographic information is 10 hours and printing is able to be performed in light of the bibliographic information, the storage period of job is one hour and a job is already deleted when printing is intended to be started.

<Description of Device Management Screen of Cloud Server>

Figure 7A:
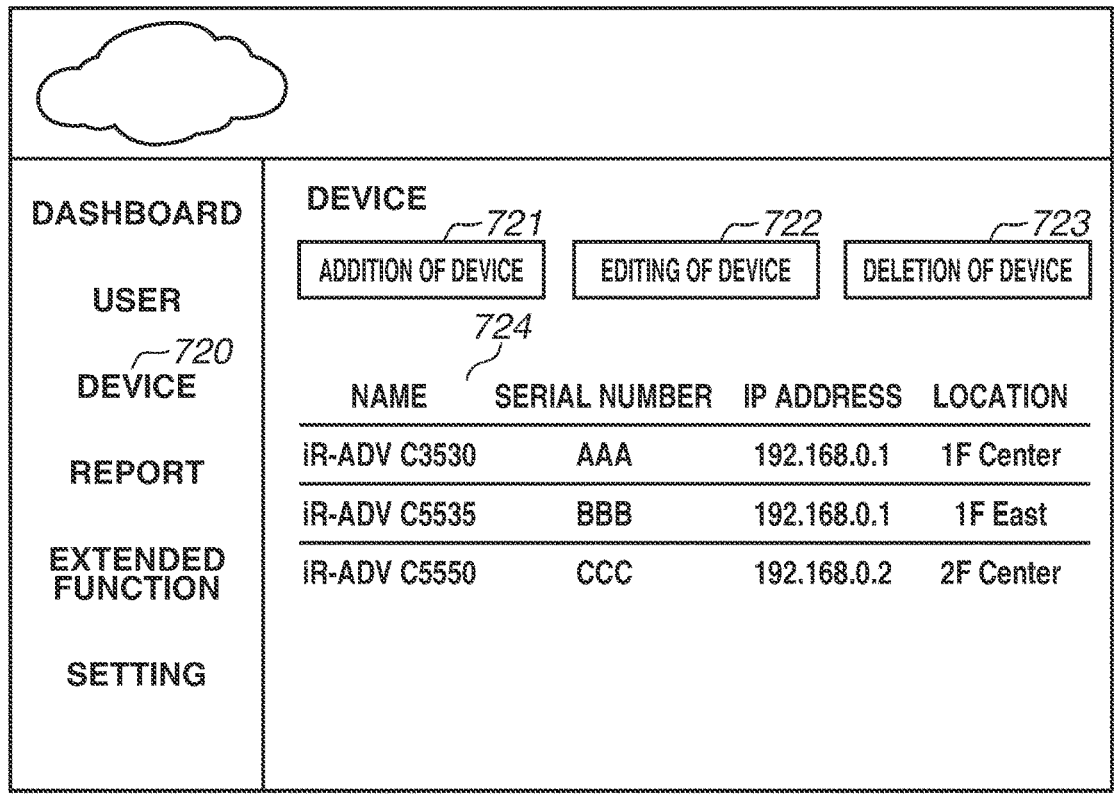
FIGS. 7A and 7B are diagrams illustrating examples of screens each of which is displayed on a browser by a setting application for the cloud server.
Figure 7B:
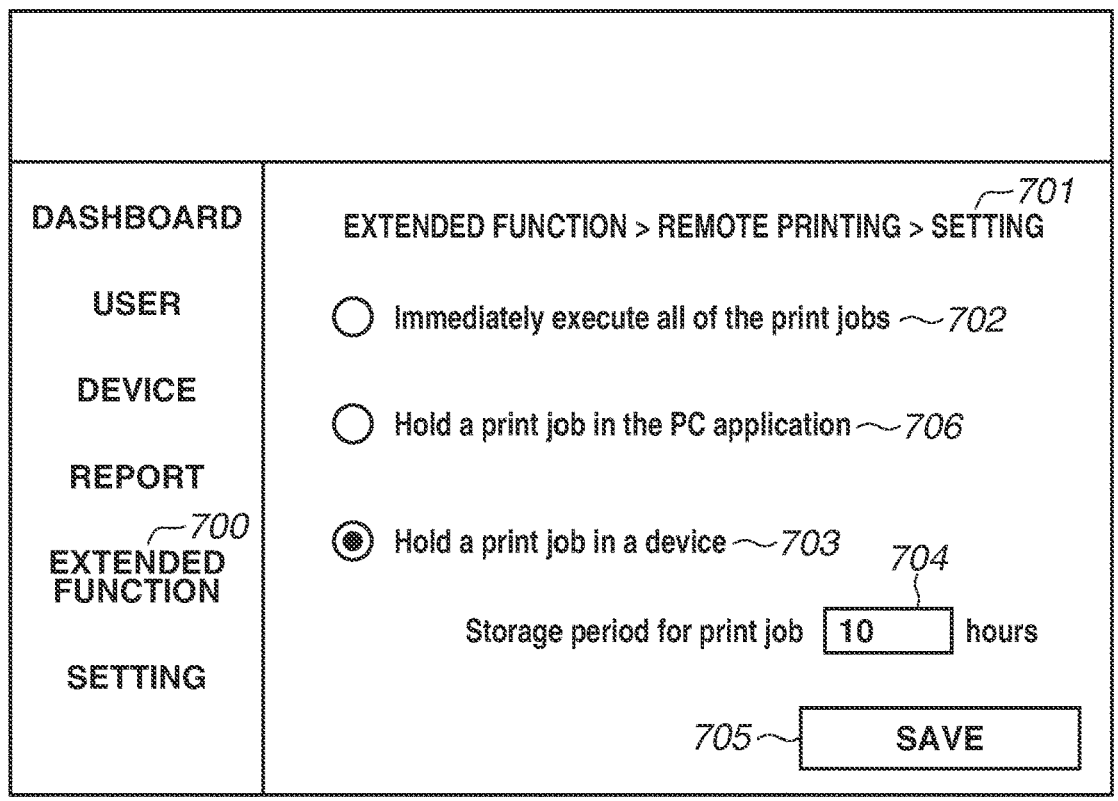

FIGS. 7A and 7B each illustrate an example of a various-function and setting screen which the cloud server 104 provides according to the present exemplary embodiment. The various-function and setting screen is generated and displayed by the applications 407 of the cloud server 104 to provide functions. The various-function and setting screen is displayed on a web browser operating in the information processing apparatus 102 by the web browser of the information processing apparatus 102 communicating with the cloud server 104.

FIG. 7A illustrates a device management display screen of the device management application 411, which is displayed by clicking on a device tab 720. In a field 724, a list of multifunction peripherals or printers each of which provides the function of the cloud server 104 is displayed. The device management display screen includes an addition of device button 721, an editing of device button 722, and a deletion of device button 723. When adding or deleting a multifunction peripheral or printer which provides a function as a cloud server, the user presses the addition of device button 721 or the deletion of device button 723. When editing information (IP address or location) about a registered device, the user presses the editing of device button 722. The cloud server provides, to a group of registered devices, functions of authentication of a user which is allowed to use a device, statistics and visualization of the usage result of printing or scanning in each device, and remote printing.

<Description of Extended Function Screen of Cloud Server>

FIG. 7B illustrates a setting screen for extended function, which is displayed by clicking on an extended function tab 700. The user is allowed to perform selection about remote printing, which is one item of the extended function, and perform setting thereof. The setting application 412, which operates in the cloud server 104, generates a screen for setting of remote printing 701. The user is allowed to select one of the following three options as a setting value to be applied.

When the user selects option "Immediately execute all of the print jobs" 702, upon receiving print jobs, all of the devices 724 registered by the device management application 411 immediately perform printing without holding the print jobs. Accordingly, this is setting in which remote printing is not able to be used.

When the user selects option "Hold a print job in the PC application" 706, upon receiving a print job, a print application installed on the information processing apparatus 102 beforehand holds the print job in an HDD included in the information processing apparatus 102. The print application generates bibliographic information about the held print job and then requests the bibliographic management application 413 of the cloud server 104 to add the generated bibliographic information. In all of the devices on the same network, when a list of pieces of bibliographic information is acquired from the bibliographic management application 413 of the cloud server 104, this becomes setting in which remote printing is able to be used. In the case of this configuration, as mentioned in background art, during execution of remote printing, an information processing apparatus in which a print job is held is required to be in an operating status.

When the user selects option "Hold a print job in a device" 703, upon receiving print jobs, all of the devices 724 registered by the device management application 411 hold the print jobs in the respective HDDs 204 of the devices 724. The devices 724 generate pieces of bibliographic information about the held print jobs and then request the bibliographic management application 413 of the cloud server 104 to add the generated pieces of bibliographic information. Even in devices other than the devices which have received print jobs, when a list of pieces of bibliographic information is acquired from the bibliographic management application 413 of the cloud server 104, this becomes setting in which remote printing is able to be used.

When option "Hold a print job in the PC application" 706 or option "Hold a print job in a device" 703 is selected, the user becomes allowed to set a storage period for print job 704. Thus, a print application on the information processing apparatus 102 in which a print job is held or the respective print applications 324 on all of the registered devices 724 store a print job or print jobs during a period set by the storage period for print job 704 after the print job or print jobs are received. When the storage period for print job 704 has elapsed, the print job or print jobs are deleted.

When the user clicks on a save button 705, the setting values in remote printing are stored, so that setting change is applied.

The screens illustrated in FIGS. 7A and 7B are merely examples, and can be replaced by, for example, a screen for setting the setting items illustrated in FIG. 6B.

Furthermore, referring to FIG. 7B, in a case where option "Hold a print job in a device" 703 has been selected, a top menu screen which is displayed in a multifunction peripheral becomes the screen illustrated in FIG. 5E. In response to the print icon 502 being pressed, remote printing is performed with use of the library function of the local print application 325. Referring to FIG. 7B, in a case where option "Hold a print job in the PC application" 706 has been selected, a top menu screen which is displayed in a multifunction peripheral becomes the screen illustrated in FIG. 5F. In response to the print icon 502 being pressed, remote printing is performed with use of a print application installed beforehand on the information processing apparatus 102. Thus, in any of the cases, while remote printing is performed, applications for use in remote printing differ from each other. In the present exemplary embodiment, in any of the cases, the same print icon is displayed. This is because of allowing the user to perform remote printing without being conscious of a difference in application.

Moreover, in a case where option "Hold a print job in a device" 703 has been selected, a configuration in which direction information for providing the function of the local print application 325 (first print application) as a library is transmitted to a multifunction peripheral can be employed.

<Substance of Bibliographic Information>

FIG. 8 is a diagram illustrating an example of the substance of bibliographic information which the bibliographic management application 413 of the cloud server 104 manages for each user.

In the example of bibliographic information which the bibliographic management application 413 manages illustrated in FIG. 8, pieces of bibliographic information 800 about two print jobs are included. Bibliographic information 800 is generated by the entry machine 103 having received a print job, and is then transmitted to the bibliographic management application 413 of the cloud server 104 and accordingly managed. Thus, pieces of bibliographic information 800 about all of the print jobs held in the devices registered by the device management application 411 of the cloud server 104 are managed by the bibliographic management application 413 of the cloud server 104.

Bibliographic information 800 includes a user name 801, a job ID 802, reception date and time 803, a storage location (an IP address and a directory path) 804, and print setting (a job name, color, paper size, the number of copies, duplex, stapling, and punching) 805. Here, bibliographic information 800 about a user the user name 801 of whom is "Sato" is illustrated. The reception date and time 803 is information indicating the date and time at which a multifunction peripheral received a print job. The storage location 804 indicates the IP address of a multifunction peripheral which currently stores a print job and the path of a directory in the HDD 204 included in the multifunction peripheral in which the print job is stored. Thus, the storage location 804 is information for identifying the storage location of a print job. The print setting 805 is set by an application installed on the information processing apparatus 102 via a printer driver. Alternatively, the print setting 805 can be changed by the print application 324 of a multifunction peripheral. Naturally, settings other than the print setting illustrated in FIG. 8 can be stored as bibliographic information 800. Moreover, although not illustrated in FIG. 8, the bibliographic information 800 can also include a printing-completion flag, which indicates whether printing for each print job is completed.

<Setting Procedure of Remote Printing>

FIG. 9A is a flowchart illustrating an example of a setting procedure for remote printing in the cloud server 104 according to the present exemplary embodiment, and FIG. 9B and FIG. 9C are flowcharts illustrating an example of a setting procedure for remote printing in the multifunction peripherals 103 and 105 according to the present exemplary embodiment. Steps S901 to S904 are steps which are performed by the setting application 412. Steps S921 to S928 are steps which are performed by the print application 324. Steps S941 to S950 are steps which are performed by the local print application 325.

First, in step S901, the setting application 412, which operates in the cloud server 104, displays a setting of remote printing on the web browser of the information processing apparatus 102. An example of a screen displayed at that time is illustrated in FIG. 7B.

In step S902, the setting application 412 receives, from the web browser of the information processing apparatus 102, an event communicating that the save button 705 has been pressed.

In step S903, the setting application 412 acquires a setting value of remote printing which has been set by the user from the web browser of the information processing apparatus 102, and determines whether the setting value has been updated from that obtained when the save button 705 was previously pressed. If it is determined that the setting value has not been updated (NO in step S903), the setting application 412 ends a series of processing operations.

The setting application 412 checks whether option "Hold a print job in a device" 703 is enabled or disabled as the setting value of remote printing. The case where option "Hold a print job in a device" 703 is enabled also includes a storage period for print job 704.

If, in step S903, it is determined that the setting value of remote printing has been updated (YES in step S903) or if the setting value has been set for the first time, the setting application 412 advances the processing to step S904, in which the setting application 412 updates a setting value published to a registered device and then ends a series of processing operations.

First, in step S921, the print application 324, which operates in each of the multifunction peripherals 103 and 105, determines whether each of the multifunction peripherals 103 and 105 itself is currently registered with the cloud server 104. If it is determined that each of the multifunction peripherals 103 and 105 is currently registered (YES in step S921), the print application 324 advances the processing to step S922, and, if it is determined that each of the multifunction peripherals 103 and 105 is not currently registered (NO in step S921), the print application 324 advances the processing to step S925.

In step S922, the print application 324 comes into a state of waiting for a predetermined time. After the elapse of the predetermined time, such as 15 minutes, the print application 324 advances the processing to step S923.

In step S923, the print application 324 connects to the cloud server 104 via the network communication 313. In step S924, the print application 324 acquires the setting value which the setting application 412 of the cloud server 104 has published in step S904. In step S925, the print application 324 determines, by comparison, whether the setting value acquired from the setting application 412 of the cloud server 104 has been updated from the setting value acquired for the previous time. If it is determined that the acquired setting value has not been updated from the setting value acquired for the previous time (NO in step S925), the print application 324 ends a series of processing operations. If it is determined that the acquired setting value has been updated from the setting value acquired for the previous time (YES in step S925), the print application 324 advances the processing to step S926. In step S926, the print application 324 checks whether, in FIG. 7B, the setting has been changed to option "Hold a print job in a device" 703 or the setting has been changed from option "Hold a print job in a device" 703 to another setting. If it is determined that the setting has been changed to option "Hold a print job in a device" 703 (YES in step S926), the print application 324 advances the processing to step S927, and, if it is determined that the setting has been changed from option "Hold a print job in a device" 703 to another setting (NO in step S926), the print application 324 advances the processing to step S928.

In step S927, the print application 324 notifies the local print application 325 of library starting, and then ends a series of processing operations. At this time, the print application 324 preliminarily issues a notification of an event listener for actively receiving a notification of bibliographic information or a notification of periodic deletion from the local print application 325 in the future. In step S928, the print application 324 notifies the local print application 325 of library ending, and then ends a series of processing operations.

First, in step S941, the local print application 325, which operates in each of the multifunction peripherals 103 and 105, waits for receiving a notification from the print application 324.

In step S942, the local print application 325 receives a notification from the print application 324, and then advances the processing to step S943.

In step S943, the local print application 325 checks whether the notification received from the print application 324 is library starting or library ending. If it is determined that the notification is library starting (YES in step S943), the local print application 325 advances the processing to step S944, and, if it is determined that the notification is library ending (NO in step S943), the local print application 325 advances the processing to step S947.

In step S944, the local print application 325 changes the setting of application to the application setting for library 620. The application setting for library 620 is set to a setting which is most appropriate for another application to implement remote printing. For example, the setting of forcible holding 621 is set to ON and the storage period of job 622 is set to 10 hours. This can be changed in such a way as to become the most appropriate setting according to a purpose. Upon completion of processing in step S944, the local print application 325 advances the processing to step S945. In step S945, the local print application 325 performs control such that the setting of application is not allowed to be changed. For example, the local print application 325 performs control such that a setting change screen (not illustrated) is not displayed on the operation unit 206 or a user operation is disabled by grayout. Upon completion of processing in step S945, the local print application 325 advances the processing to step S946. In step S946, the local print application 325 hides the icon for local print application 501. This is because the local print application 325 is used as a library and is, therefore, desired not to operate as an application. Thus, since the function of the local print application 325 (local print) includes the function of the print application 324 (local print and remote print), the local print application 325 hides the local print icon 501. An example of a screen displayed at that time is illustrated in FIG. 5E. Upon completion of processing in step S946, the local print application 325 advances the processing to step S950.

Figure 5F:
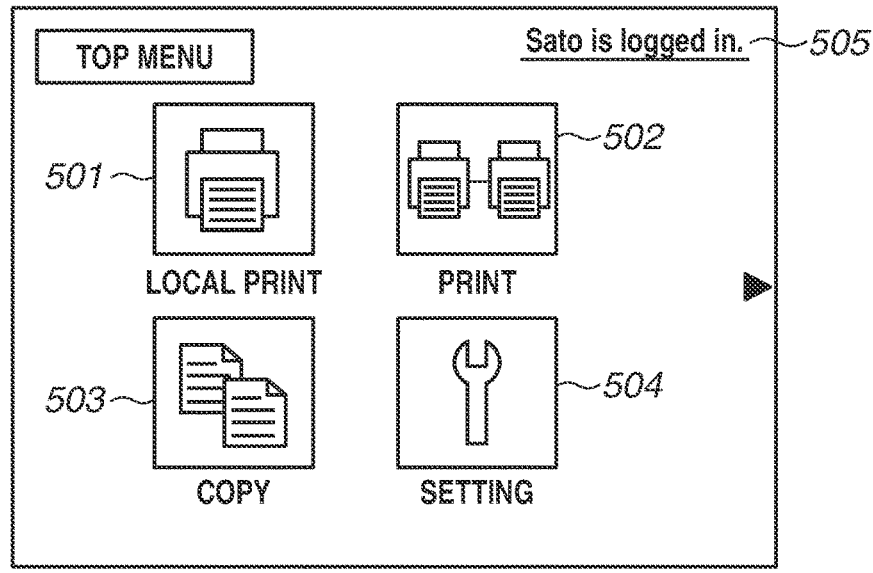

In step S947, the local print application 325 changes the setting of application to the application setting for application 600. The application setting for application 600 can be set as default setting for the application setting, or can be set as an optional setting value. Upon completion of setting in step S947, the local print application 325 advances the processing to step S948. In step S948, the local print application 325 performs control such that the setting of application is allowed to be changed. For example, the local print application 325 performs control such that a setting change screen (not illustrated) is displayed on the operation unit 206. Upon completion of processing in step S948, the local print application 325 advances the processing to step S949. In step S949, the local print application 325 displays the icon for local print application 501. An example of a screen displayed at that time is illustrated in FIG. 5A or FIG. 5F. Whether to display the print icon 502 depends on the setting performed with respect to the screen illustrated in FIG. 7B. Upon completion of processing in step S949, the local print application 325 advances the processing to step S950.

In step S950, the local print application 325 transitions to a state of waiting for a notification from the print application 324 again, and then ends a series of processing operations.

<Print Job Transmission Procedure>

An example of a procedure in which the user transmits a print job from the information processing apparatus 102 to the multifunction peripheral 103 serving as an entry machine. In the following description, the multifunction peripheral 103 is assumed to be managed by the authentication application 321 with respect to authentication.

In the present exemplary embodiment, an example in which a print setting value and page-description language (PDL) data are transmitted as a print job to the multifunction peripheral 103 is described. PDL includes, for example, LIPS® of Canon Inc., and PostScript® of Adobe Inc., and the multifunction peripheral 103 performs printing by interpreting PDL and performing raster image processing (RIP). Furthermore, a print job is not limited to PDL data but only needs to have a format which is able to be interpreted and printed by the multifunction peripheral 103, such as image data of, for example, Tag Image File Format (TIFF) and a document format of an application.

The user activates a printer driver via an application which operates on the information processing apparatus 102. After performing print setting via a printer driver screen (not illustrated), the user selects the multifunction peripheral 103 and issues an instruction to the multifunction peripheral 103 to perform printing. Here, the user is also able to expressly issue an instruction to the multifunction peripheral 103 to perform hold printing.

Upon receiving a printing instruction, the printer driver displays an authentication screen (not illustrated). After entering authentication information, the user issues an instruction for printing. The printer driver transmits, to the multifunction peripheral 103, an authentication request as well as a user name and a password. The authentication application 321 of the multifunction peripheral 103 communicates with the authentication application 410 of the cloud server 104 to perform matching of the received user name and password for authentication, and then transmits an authentication result to the personal computer (information processing apparatus 102). The printer driver receives the authentication result, and, if authentication is failed, the printer driver terminates print processing with error.

If authentication is successful, the printer driver converts application data into PDL to generate a print job. Additionally, the printer driver causes user information and the designated print setting to be included in the print job. The printer driver transmits the generated print job to the multifunction peripheral 103.

Here, in a case where the information processing apparatus 102 and the multifunction peripheral 103 are present at the same authentication domain and the authentication result of the information processing apparatus 102 is assured, the information processing apparatus 102 and the multifunction peripheral 103 can operate as follows. Specifically, without issuing an authentication request to the multifunction peripheral 103, the printer driver can use user information about the information processing apparatus 102. Moreover, while omitting authentication processing to be performed by the printer driver, the printer driver can use user information which is previously registered with the printer driver.

<Print Job Reception Processing Procedure>

FIG. 10A and FIG. 10B are flowcharts illustrating examples of print job reception processing procedures in the multifunction peripheral 103 operating as an entry machine according to the present exemplary embodiment, which are performed by the CPU 201 of the multifunction peripheral 103. Steps S1001 to S1014 are steps which are performed by the local print application 325. Steps S1021 to S1026 are steps which are performed by the print application 324.

First, in step S1001, the job and device control 304 waits for receiving a print job. In step S1002, the job and device control 304 receives a print job via the network I/F 210, and then notifies the local print application 325 of reception of the print job. In step S1003, the local print application 325 checks whether the setting of forcible holding 621 of the application setting 620 is set to ON.

If it is determined that the setting of forcible holding 621 is set to OFF (NO in step S1003), the local print application 325 issues a printing execution request to the job and device control 304 and then advances the processing to step S1013.

In step S1013, the job and device control 304 performs raster image processing (RIP) on the print job according to the print setting, and, in step S1014, the job and device control 304 issues a printing instruction to the printer unit 209 via the device I/F 207, thus performing printing.

if, in step S1003, it is determined that the setting of forcible holding 621 is set to ON (YES in step S1003), the local print application 325 advances the processing to step S1004, in which the local print application 325 stores the print job in the HDD 204 of the multifunction peripheral 103.

In step S1005, the local print application 325 analyzes the stored print job and thus acquires a user name included in the print job.

In step S1006, the local print application 325 analyzes the print setting of the stored print job.

In step S1007, the local print application 325 generates bibliographic information 800 from the print setting of the stored print job analyzed in step S1006.

In step S1008, the local print application 325 requests the print application 324 to register the bibliographic information 800 generated in step S1007 with use of the event listener received in step S942.

In step S1009, the local print application 325 receives a result of registration of the bibliographic information from the print application 324.

In step S1010, the local print application 325 determines whether registration of the bibliographic information 800 with the bibliographic management application 413 of the cloud server 104 is successful. If it is determined that registration of the bibliographic information 800 is successful (YES in step S1010), the local print application 325 advances the processing to step S1012, in which the local print application 325 transitions to a state of waiting for receiving a print job again. If it is determined that registration of the bibliographic information 800 is failed (NO in step S1010), then in step S1011, the local print application 325 deletes the print job stored in step S1004 from the HDD 204, and then advances the processing to step S1012, in which the local print application 325 transitions to a state of waiting for receiving a print job again.

Thus, a series of processing operations which are performed during data entry by the local print application 325 is ended.

First, in step S1021, the print application 324 waits for receiving a notification from the local print application 325.

In step S1022, the print application 324 receives a notification from the local print application 325, and then advances the processing to step S1023.

In step S1023, the print application 324 requests the bibliographic management application 413 of the cloud server 104 to register bibliographic information.

In step S1024, the print application 324 receives a result of registration of the bibliographic information from the cloud server 104.

In step S1025, the print application 324 transmits the result of registration of the bibliographic information received in step S1024 to the local print application 325.

In step S1026, the print application 324 transitions to a state of waiting for receiving a notification from the local print application 325 again, and then ends a series of processing operations.

<Print Processing Procedure>

FIG. 11A and FIG. 11B are flowcharts illustrating examples of print processing procedures in the multifunction peripheral 105 serving as an output machine, which are performed when the user has pressed the print button 518 or 559 with respect to a print job selected by the user according to the present exemplary embodiment. These flowcharts are executed by the CPU 201 of the multifunction peripheral 105. Steps S1101 to S1116 are steps which are performed by the print application 324. Steps S1121 to S1127 are steps which are performed by the local print application 325.

First, in step S1101, the print application 324 performs print queue display 510 on the operation unit 206 of the multifunction peripheral 105. When displaying a print queue, the print application 324 connects to the cloud server 104 via the network communication 313. Then, the print application 324 separately acquires bibliographic information about the user-authenticated logged-in user name "Sato" from the bibliographic management application 413, and then stores the acquired bibliographic information in the RAM 202. Then, the print application 324 performs print queue display 510 with use of the stored bibliographic information.

In step S1102, the print application 324 receives a printing execution job list from the application platform 307. The printing execution job list is directed to print jobs selected by the user from the print jobs 515 and 516 which are displayed in the print queue 510.

In step S1103, the print application 324 reads, from the RAM 202, bibliographic information 800 about a leading print job included in the received printing execution job list.

In step S1104, the print application 324 extracts the storage location (an IP address and a directory path) 804 of the print job from the bibliographic information 800.

In step S1105, the print application 324 determines, based on the IP address of the extracted storage location 804 of the print job, whether the print job is present in the HDD 204 of the multifunction peripheral 105 itself or is present in another device. If it is determined that the print job is present in the HDD 204 of the multifunction peripheral 105 itself (NO in step S1105), the print application 324 advances the processing to step S1107. If it is determined that the print job is present in another device (YES in step S1105), the print application 324 advances the processing to step S1106.

In step S1106, the print application 324 issues a printing request for the print job to an entry machine 103 in which the print job is stored, via the network communication 313. The print application 324 operating in the entry machine 103 receives the printing request and then performs print processing. Furthermore, in a case where the print processing has been performed by the entry machine 103, in step S1105, it is determined that the print job is present in the HDD 204 of the multifunction peripheral 105 itself. Upon completion of processing in step S1106, the print application 324 advances the processing to step S1114.

In step S1107, the print application 324 extracts a job ID from the bibliographic information and then sets the extracted job ID as one of printing request parameters for the print job.

In step S1108, the print application 324 extracts a print setting from the bibliographic information and then sets the extracted print setting as one of printing request parameters for the print job.

In step S1109, the print application 324 sets the IP address of the multifunction peripheral 105 (output machine) serving as a transmission destination for a print job as one of printing request parameters for the print job.

In step S1110, the print application 324 transmits a printing request together with the printing request parameters generated in steps S1107, S1108, and S1109 to the local print application 325.

In step S1111, the print application 324 receives a printing result from the local print application 325.

In step S1112, the print application 324 determines whether printing is successful. If it is determined that printing is failed (NO in step S1112), the print application 324 advances the processing to step S1113, in which the print application 324 performs printing error display on the operation unit 206. If it is determined that printing is successful (YES in step S1112), the print application 324 advances the processing to step S1114.

In step S1114, the print application 324 checks whether all of the print jobs for which a print instruction has been issued have been executed.

If it is determined that there is still a print job that is not yet executed (YES in step S1114), then in step S1115, the print application 324 reads bibliographic information about a next print job, and then repeatedly performs processing in step S1104 and subsequent steps.

If, in step S1114, it is determined that there is no print job that is not yet executed (NO in step S1114), the print application 324 advances the processing to step S1116, in which the print application 324 re-performs print queue display on the operation unit 206. In this way, the print application 324 ends a series of processing operations for printing.

First, in step S1121, the local print application 325 waits for receiving a notification from the print application 324.

In step S1122, the local print application 325 receives a notification from the print application 324, and then advances the processing to step S1123.

In step S1123, the local print application 325 changes the print setting of the print job based on the job ID and print setting of bibliographic information included in the printing request received in step S1122.

In step S1124, the local print application 325 requests the IP address of the output machine included in the printing request received in step S1122 to transmit the print job.

In step S1125, the local print application 325 receives a result of transmission of the print job.

In step S1126, the local print application 325 transmits the result of transmission of the print job received in step S1125 to the print application 324.

In step S1127, the local print application 325 transitions to a state of waiting for a notification from the print application 324 again, and then ends a series of processing operations.

<Deletion Processing Procedure>

FIG. 12A and FIG. 12B are flowcharts illustrating an example of a deletion processing procedure in the multifunction peripheral 105 serving as an output machine, which is performed when the user has pressed the deletion button 519 with respect to the selected print job according to the present exemplary embodiment. These flowcharts are performed by the CPU 201 of the multifunction peripheral 105. Steps S1201 to S1212 are steps which are performed by the print application 324. Steps S1221 to S1224 are steps which are performed by the local print application 325.

First, in step S1201, the print application 324 performs print queue display 510 on the operation unit 206 of the multifunction peripheral 105. When performing print queue display, the print application 324 connects to the cloud server 104 via the network communication 313. Then, the print application 324 separately acquires bibliographic information about the user-authenticated logged-in user name "Sato" from the bibliographic management application 413, and then stores the acquired bibliographic information in the RAM 202. Then, the print application 324 performs print queue display 510 with use of the stored bibliographic information.

In step S1202, the print application 324 receives a deletion execution job list from the application platform 307. The deletion execution job list is directed to a print job selected by the user from among the print jobs 515 and 516 displayed in the print queue 510.

In step S1203, the print application 324 reads bibliographic information 800 about a leading print job included in the received deletion execution job list from the RAM 202.

In step S1204, the print application 324 extracts a storage location (an IP address and a directory path) 804 of a print job targeted for deletion from the bibliographic information 800.

In step S1205, the print application 324 determines whether the print job targeted for deletion is present in the HDD 204 of the device itself or present in another device, based on the IP address of the extracted storage location 804 of the print job. If it is determined that the print job is present in the HDD 204 of the device itself (NO in step S1205), the print application 324 advances the processing to step S1207.

If it is determined that the print job is present in another device (YES in step S1205), the print application 324 advances the processing to step S1206.

In step S1206, the print application 324 requests the entry machine 103 in which the print job is stored to delete the print job via the network communication 313. The print application 324 operating in the entry machine 103 receives this deletion request and then performs deletion processing. Furthermore, in a case where deletion processing has been performed by the entry machine 103, in step S1205, it is determined that the print job is present in the HDD 204 of the device itself. Upon completion of processing in step S1206, the print application 324 advances the processing to step S1210.

In step S1207, the print application 324 extracts a job ID from the bibliographic information and sets the extracted job ID as one of deletion request parameters for the print job.

In step S1208, the print application 324 transmits a deletion request together with the deletion request parameter generated in step S1207 to the local print application 325.

In step S1209, the print application 324 requests the bibliographic management application 413 of the cloud server 104 to delete bibliographic information about the deleted print job.

In step S1210, the print application 324 checks whether deletion of all of the print jobs for which a deletion instruction has been issued has been executed.

If it is determined that there is still a print job that is not yet deleted (YES in step S1210), then in step S1211, the print application 324 reads bibliographic information about a next print job to be deleted, and then repeatedly performs processing in step S1204 and subsequent steps.

If, in step S1210, it is determined that there is no print job that is not yet deleted (NO in step S1210), the print application 324 advances the processing to step S1212, in which the print application 324 re-performs print queue display on the operation unit 206. In this way, the print application 324 ends a series of processing operations.

First, in step S1221, the local print application 325 waits for receiving a notification from the print application 324.

In step S1222, the local print application 325 receives a notification from the print application 324, and then advances the processing to step S1223.

In step S1223, the local print application 325 deletes a print job stored in the HDD 204 based on the job ID of bibliographic information included in the deletion request received in step S1222, via the file system 303.

In step S1224, the local print application 325 transitions to a state of waiting for a notification from the local print application 325 again, and then ends a series of processing operations.

<Periodic Deletion Processing Procedure>

Figure 13A:
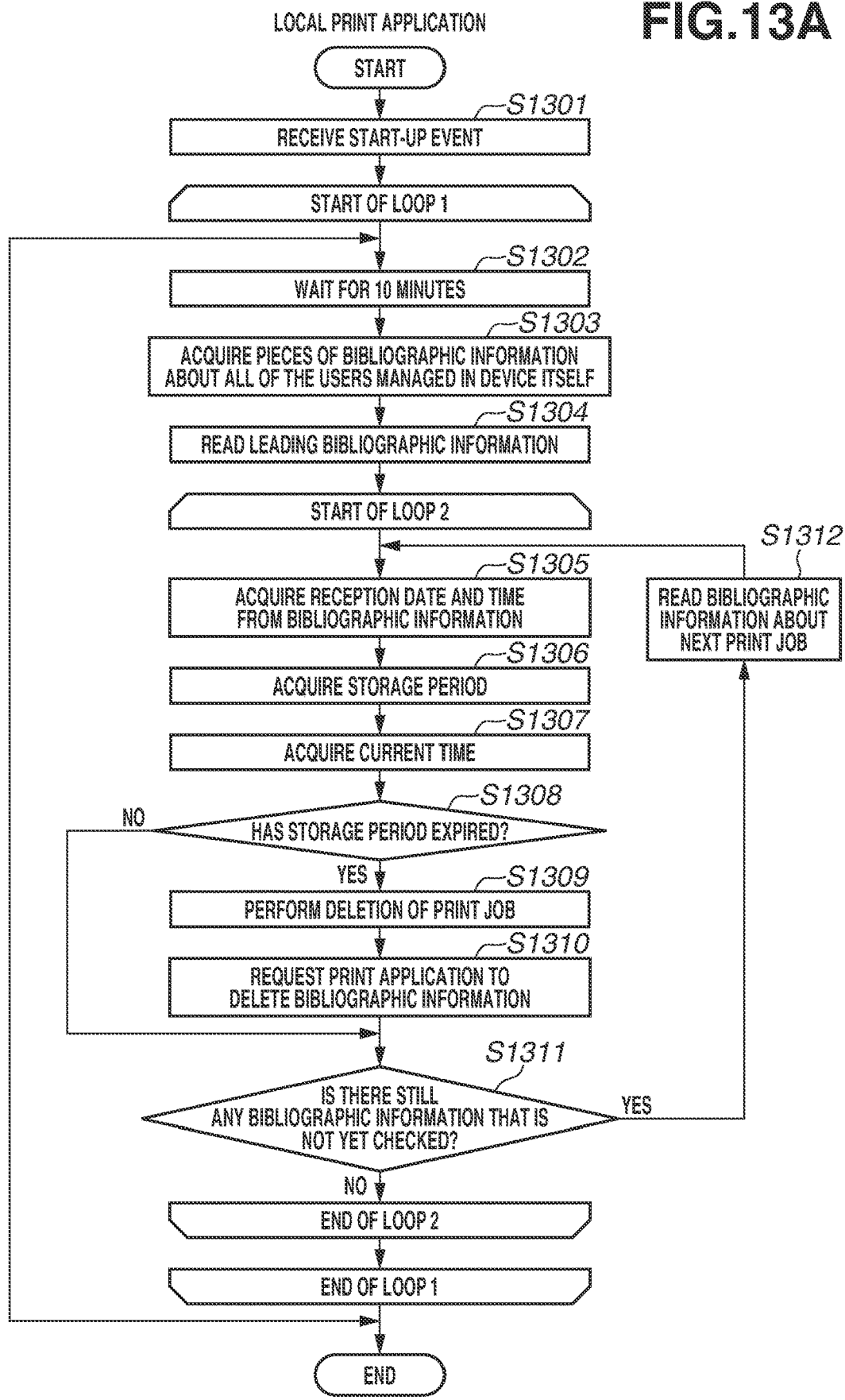

FIG. 13A and FIG. 13B are flowcharts illustrating an example of an automatic deletion processing procedure for a document associated with the expiration of a storage period of a held document in the multifunction peripheral 103 serving as an entry machine, which is performed by the CPU 201 of the multifunction peripheral 103 according to the present exemplary embodiment. Steps S1301 to S1312 are steps which are performed by the local print application 325. Steps S1321 to S1324 are steps which are performed by the print application 324.

First, in step S1301, when the multifunction peripheral 103 is powered on and started up, the local print application 325 receives a start-up event from the application platform 307.

In step S1302, the local print application 325 waits for 10 minutes after receiving the start-up event.

In step S1303, the local print application 325 reads pieces of bibliographic information about all of the users managed by the account management 311, from the HDD 204 via the file system 303, and then loads the read pieces of bibliographic information onto the RAM 202.

In step S1304, the local print application 325 reads leading bibliographic information 800 included in the acquired pieces of bibliographic information from the RAM 202.

In step S1305, the local print application 325 acquires the reception date and time 803 from the bibliographic information 800.

In step S1306, the local print application 325 acquires the storage period of job 622 from the application setting 620. In this example, the storage period of job 622 is set to 10 hours.

In step S1307, the local print application 325 acquires current time from the system service 306.

In step S1308, the local print application 325 determines whether the storage period of a print job corresponding to the selected bibliographic information has expired. This determination is performed by determining whether a mathematical expression of "current time−reception date and time>storage period" is satisfied.

If, in step S1308, it is determined that the storage period of a print job corresponding to the selected bibliographic information has expired (YES in step S1308), the local print application 325 advances the processing to step S1309.

In step S1309, the local print application 325 deletes a print job the storage period of which has expired, from the HDD 204 via the file system 303.

In step S1310, the local print application 325 requests the print application 324 to delete the bibliographic information, together with the job ID, about the deleted print job with use of the event listener received in step S942.

If, in step S1308, it is determined that the storage period of a print job corresponding to the selected bibliographic information has not expired (NO in step S1308), the local print application 325 advances the processing to step S1311.

In step S1311, the local print application 325 determines whether there is still bibliographic information the storage period of which has not yet expired out of the pieces of bibliographic information acquired in step S1303.

If it is determined that there is still bibliographic information that has not yet been checked (YES in step S1311), then in step S1312, the local print application 325 reads bibliographic information about a next print job to be determined, and then repeatedly performs processing in step S1305 and subsequent steps.

If, in step S1311, it is determined that there is no print job that has not yet been checked (NO in step S1311), the local print application 325 ends a series of processing operations for periodic deletion.

Steps S1302 to S1312, which are processing for periodic deletion, are next performed after 10 minutes, so that periodic deletion processing is performed at intervals of 10 minutes.

First, in step S1321, the print application 324 waits for receiving a notification from the local print application 325.

In step S1322, the print application 324 receives a notification from the local print application 325, and then advances the processing to step S1323.

In step S1323, the print application 324 requests the bibliographic management application 413 of the cloud server 104 to delete bibliographic information based on the job ID included in the deletion request for bibliographic information received in step S1322.

In step S1324, the print application 324 transitions to a state of waiting for a notification from the local print application 325 again, and then ends a series of processing operations.

In the present exemplary embodiment, in the screen illustrated in FIG. 5A, the print icon 502 is hidden, and, in the screen illustrated in FIG. 5E, the local print icon 501 is hidden. However, these icons can be displayed in such a display format as to cause the user to recognize that, even if the user presses each icon, the corresponding function is not executed (for example, in the form of a grayed out icon).

According to the present exemplary embodiment, a function which an application installed on a multifunction peripheral has is provided as a library and another application uses the function, so that a remote printing function can be provided to the user. Moreover, it becomes unnecessary to previously install, on a PC, an application for holding a print job in a terminal apparatus (PC application), so that the setting procedure to be performed by the user can be reduced. Additionally, even in a case where an application uses a library function of another application, a desired setting can be applied to execute the function.

According to the above-described exemplary embodiment, even in a case where an application uses a library function of another application, a desired setting can be applied to execute the function.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-118805 filed Jun. 26, 2019, which is hereby incorporated by reference herein in its entirety.

What is claimed is:

1. An image forming apparatus comprising:
one or more processors; and
a local print application including at least a reserving function of reserving a print job in the image forming apparatus and a remote print application not including at least the reserving function;
at least one memory storing executable instructions, which when executed by the one or more processors, cause the image forming apparatus to:
set a setting value about an operation of the local print application, wherein the setting value includes at least a setting value for enabling or disabling the reserving function;
acquire print data;
using the local print application, reserve the print job in the image forming apparatus in a case where the reserving function is enabled, and not reserve the print job in the image forming apparatus but execute printing in a case where the reserving function is disabled;
hold a setting value for a library to be used for providing the reserving function of the local print application to the remote print application as the library, wherein the setting value for the library includes at least a setting value for enabling the reserving function;
receive instruction information for providing the reserving function of the local print application as the library; and
change the setting value of the local print application to the held setting value for the library when the reserving function of the local print application is provided to the remote print application as the library based on the instruction information,
wherein the local print application is an application for causing the image forming apparatus to print the print data reserved in the image forming apparatus, and
wherein the remote print application is an application for causing an image forming apparatus different from the image forming apparatus to print the print data reserved in the image forming apparatus.

2. The image forming apparatus according to claim 1, wherein the setting value for the library is a setting value for the remote print application, and
wherein the function of the local print application is provided as the library to the remote print application.

3. The image forming apparatus according to claim 2, wherein a screen contains an icon for executing the remote print application.

4. The image forming apparatus according to claim 2, wherein the local print application is an application having a local print function which prints print data held in the image forming apparatus, and
wherein the remote print application is an application having the remote printing function which prints print data held in an apparatus different from the image forming apparatus.

5. A control method for an image forming apparatus including a local print application including at least a reserving function of reserving a print job in the image forming apparatus and a remote print application not including at least the reserving function, the control method comprising:

setting a setting value about an operation of the local print application, wherein the setting value includes at least a setting value for enabling or disabling the reserving function;

acquiring print data;

using the local print application, reserving the print job in the image forming apparatus in a case where the reserving function is enabled, and not reserve the print job in the image forming apparatus but execute printing in a case where the reserving function is disabled;

holding a setting value for a library to be used for providing the reserving function of the local print application to the remote print application as the library, wherein the setting value for the library includes at least a setting value for enabling the reserving function;

receiving instruction information for providing the reserving function of the local print application as the library; and changing the setting value of the local print application to the held setting value for the library when the reserving function of the local print application is provided to the remote print application as the library based on the instruction information, wherein the local print application is an application for causing the image forming apparatus to print the print data reserved in the image forming apparatus; and wherein the remote print application is an application for causing an image forming apparatus different from the image forming apparatus to print the print data reserved in the image forming apparatus.

6. The control method according to claim 5,
wherein the setting value for the library is a setting value for the remote print application, and
wherein the function of the local print application is provided as the library to the remote print application.

7. The control method according to claim 6, wherein a screen contains an icon for executing the remote print application.

8. The control method according to claim 6,
wherein the local print application is an application having a local print function which prints print data held in the image forming apparatus, and
wherein the remote print application is an application having the remote printing function which prints print data held in an apparatus different from the image forming apparatus.

9. A non-transitory computer-readable storage medium storing computer-executable instructions that, when executed by one or more processors of an image forming apparatus including a local print application including at least a reserving function of reserving a print job in the image forming apparatus and a remote print application not including at least the reserving function, cause the image forming apparatus to perform operations comprising:

setting a setting value about an operation of the local print application, wherein the setting value includes at least a setting value for enabling or disabling the reserving function;

acquiring print data;

using the local print application, reserving the print job in the image forming apparatus in a case where the reserving function is enabled, and not reserve the print job in the image forming apparatus but execute printing in a case where the reserving function is disabled;

holding a setting value for a library to be used for providing the reserving function of the local print application to the remote print application as the library, wherein the setting value for the library includes at least a setting value for enabling the reserving function;

receiving instruction information for providing the reserving function of the local print application as the library; and changing the setting value of the local print application to the held setting value for the library when the reserving function of the local print application is provided to the remote print application as the library based on the instruction information, wherein the local print application is an application for causing the image forming apparatus to print the print data reserved in the image forming apparatus, and wherein the remote print application is an application for causing an image forming apparatus different from the image forming apparatus to print the print data reserved in the image forming apparatus.

10. The image forming apparatus according to claim 1, wherein the executable instructions, when executed by the one or more processors, further cause the image forming apparatus to:

generate bibliographic information related to the print job using the local print application;

register the bibliographic information in an external apparatus using the local print application;

receive the bibliographic information from the external apparatus using the local print application; and execute printing based on the bibliographic information.

* * * * *